US006769054B1

(12) United States Patent
Sahin et al.

(10) Patent No.: US 6,769,054 B1
(45) Date of Patent: *Jul. 27, 2004

(54) SYSTEM AND METHOD FOR PREPARATION OF WORKLOAD DATA FOR REPLAYING IN A DATA STORAGE ENVIRONMENT

(75) Inventors: Adnan Sahin, Brookline, MA (US); Sachin More, Westborough, MA (US); Paul F. Hale, Hudson, MA (US)

(73) Assignee: EMC Corporation, Hopkinton, MA (US)

(*) Notice: Subject to any disclaimer, the term of this patent is extended or adjusted under 35 U.S.C. 154(b) by 16 days.

This patent is subject to a terminal disclaimer.

(21) Appl. No.: 10/335,643

(22) Filed: Dec. 31, 2002

Related U.S. Application Data

(63) Continuation-in-part of application No. 10/180,849, filed on Jun. 26, 2002, and a continuation-in-part of application No. 09/794,696, filed on Feb. 26, 2001.

(51) Int. Cl.[7] .............................................. G06F 11/34
(52) U.S. Cl. ........................ 711/162; 717/124; 717/128; 714/45
(58) Field of Search ................................ 717/124, 128; 711/162; 714/48

(56) References Cited

U.S. PATENT DOCUMENTS

| 5,560,036 A | * | 9/1996 | Yoshida ...................... 712/227 |
| 6,101,497 A | * | 8/2000 | Ofek ............................. 707/10 |
| 2003/0088854 A1 | * | 5/2003 | Wygodny et al. ........... 717/130 |

FOREIGN PATENT DOCUMENTS

| JP | 402201552 A | * | 8/1990 |
| JP | 405257758 A | * | 10/1993 |
| JP | 406028268 A | * | 2/1994 |
| JP | 406266630 A | * | 9/1994 |

* cited by examiner

Primary Examiner—Jack A. Lane
(74) Attorney, Agent, or Firm—Robert Kevin Perkins; Leanne J. Fitzgerald; John M. Gunther

(57) ABSTRACT

This invention is a system and method for preparing workload data that may be accessed in a data storage environment and then replayed for testing or other reasons. The invention has the capability to prepare a trace of I/Os to a data storage system for an extended period of time for replaying these I/Os back to that or another system. Variables may also be manipulated through a preparation process and is particularly useful for customizing benchmarking tests, or consolidation, or trouble-shooting, or capacity planning.

12 Claims, 18 Drawing Sheets

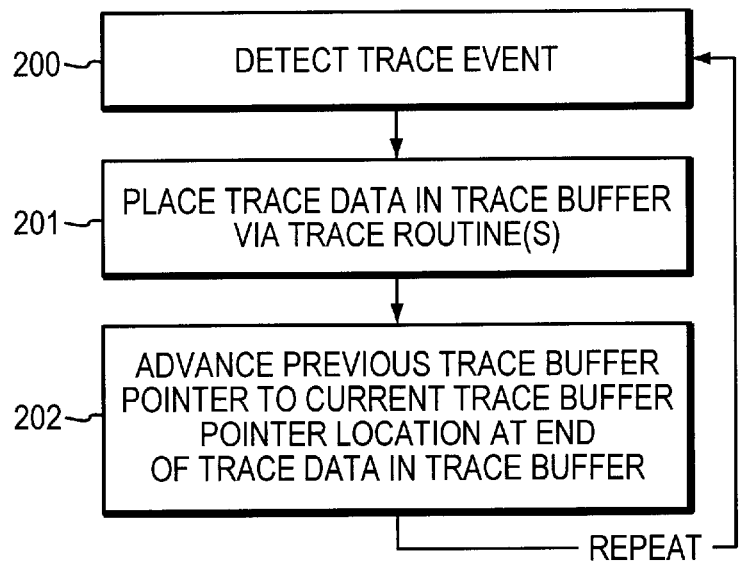
FIG. 3A  TRACE BUFFER OPERATION
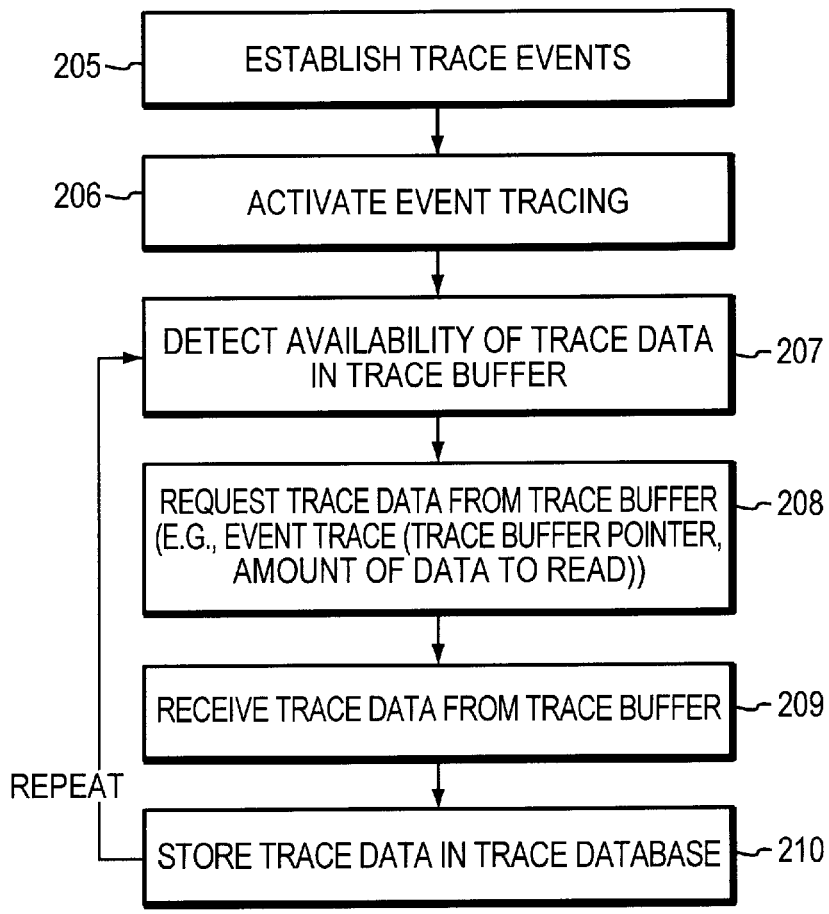
FIG. 3B  TRACE CAPTURE PROCESS OPERATION

FIG. 5 TRACE CAPTURE PROCESS OPERATION

FIG. 6  EVENT TRACE OPERATION

| TIME STAMP | PORT A DIRECTOR 155 | PORT B DIRECTOR 155 | PORT A DIRECTOR 157 | PORT B DIRECTOR 157 |
|---|---|---|---|---|
| $t_0$ | $I/O_0(A\text{-}155)$ | $I/O_0(B\text{-}155)$ | $I/O_0(A\text{-}157)$ | $I/O_0(B\text{-}157)$ |
| $t_i$ | $I/O_i(A\text{-}155)$ | $I/O_i(B\text{-}155)$ | $I/O_i(A\text{-}157)$ | $I/O_i(B\text{-}157)$ |
| $t_{i+1}$ | $I/O_{i+1}(A\text{-}155)$ | $I/O_{i+1}(B\text{-}155)$ | $I/O_{i+1}(A\text{-}157)$ | $I/O_{i+1}(B\text{-}157)$ |
| | | | | |
| $t_{i+n}$ | $I/O_{i+n}(A\text{-}155)$ | $I/O_{i+n}(B\text{-}155)$ | $I/O_{i+n}(A\text{-}157)$ | $I/O_{i+n}(B\text{-}157)$ |

UNRAVELED TRACE THREAD - TABLE (520)

FIG. 9

SYSTEM AND METHOD FOR PREPARATION OF WORKLOAD DATA FOR REPLAYING IN A DATA STORAGE ENVIRONMENT

RELATED APPLICATIONS

This application is a continuation-in-part of U.S. patent application Ser. No. 10/180,849 entitled SYSTEM AND METHOD FOR REPLAYING WORKLOAD DATA IN A DATA STORAGE ENVIRONMENT to William Zahavi et al. filed Jun. 26, 2002 and is also a continuation-in-part of U.S. patent application Ser. No. 09/794,696 entitled METHODS AND APPARATUS FOR ACCESSING TRACE DATA" to William Zahavi et al. filed Feb. 26 2001 and this application claims priority to both of these earlier applications respective filing dates under 35 U.S.C. 120, and incorporates both of these earlier applications by reference and wherein both of these incorporated applications are assigned to EMC Corporation the assignee of the present application.

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to systems and methods for preparation of workload data from a data storage environment for replaying, and more particularly to a system and method that may access trace data of workload activity produced in a data storage system, prepare it, and then replay the trace data in the same or a different environment for benchmark testing or other reasons.

BACKGROUND OF THE INVENTION

Testing the workload environment of a data storage environment including at least one data storage system and at least one software application operating on a host computer in communication with the data storage system is a complex task. It often requires that the business have a separate test-bed that contains a duplicate set of hardware where such tests take place. Large companies such as telecommunications companies, airlines, banks, and insurance companies routinely populate a test lab with a large amount of equipment including software applications for emulating production conditions. Other companies rely on vendors providing systems and software to run tests for them but sometimes the various vendors are unable to replicate the myriad of configurations that a particular customer may encounter within their own data storage environment.

The actual execution of application load-tests requires that a copy of the production database(s) be loaded on the storage systems and that a workload driver be created to generate either batch jobs or transactions that attempt to duplicate the production workload. Setup times and the analysis of the test results make such an effort extremely complex and limits such activities to only very few businesses that can afford the time and personnel costs.

The complexity of such a task often reduces these tests to various levels of simplicity where the results do not reflect the actual application. Furthermore, it becomes even more complicated to experiment with alternative configurations and map them onto the production system. Add to this the common requirement to see the effect of multiple applications on the same storage system and the problem is even further compounded.

Data Storage owners who try to shortcut this effort often resort to general-purpose Input/Output (I/O) drivers that are available in the marketplace. Such drivers do not attempt to duplicate an existing workload. They simply provide the user with the ability to specify a specific stream of I/Os to specific data volumes or logical devices.

It would be an advancement in the computer arts, and particularly the data storage arts to have a solution that could duplicate a workload in a data storage environment but would reduce the complexity of existing systems. Further, if such a solution significantly increased the accuracy and flexibility of such tests that would also be a significant advantage over prior art techniques.

One area wherein duplicated workloads are useful is that of benchmark testing. But prior art benchmarking approach in storage industry has been running static (i.e., canned), idealized, uniform IO workloads. However, in many cases these benchmarks have no bearing to the actual environment on which benchmark results are desired. It would be an advancement in the arts to provide an invention with a new methodology for benchmarking storage by replaying exact IO trace of customer traces in different storage hardware and software platforms. It would be a further advancement if such a solution could customize the benchmark workload based on customers real production workload.

It would also be an advancement in the computer arts if an invention having the advantages above was also capable of being used comparing alternative algorithms from a performance perspective. It would also be advantageous if such an invention could be used for consolidation and capacity planning, i.e. allowing engineers to size new implementations with workload data collected from existing storage implementations.

Further it would be advantageous to have an invention that could be used for problem recreation and troubleshooting by recreating the problem workload and carrying out various "what-if" scenarios.

SUMMARY OF THE INVENTION

To overcome the problems of the prior art mentioned above and to provide advantages also described above, this invention is a system and method for preparing captured traces of workload data for replaying that duplicates or selectively varies a workload scenario operating in a data storage environment.

The method includes preparing a trace of workload activity experienced on one or more data storage volumes included with a first data storage system, for playing a replication of the trace of workload data on one or more data storage volumes included with a second data storage system. The first and second system can be the same or a different system, i.e., the workload activity is replayed on the same or a different system from that on which it was captured. Preferably the workload activity is accessed in the form of I/O activity.

In another embodiment, a system is provided that is configured for performing the steps of preparing a trace of workload activity experienced on one or more data storage volumes included with a first data storage system, for playing a replication of the trace of workload data on one or more data storage volumes included with a second data storage system.

In another embodiment, a program product is provided that is configured for performing the steps of preparing a trace of workload activity experienced on one or more data storage volumes included with a first data storage system, for playing a replication of the trace of workload data on one or more data storage volumes included with a second data storage system.

BRIEF DESCRIPTION OF THE DRAWINGS

The above and further advantages of the present invention may be better under stood by referring to the following description taken into conjunction with the accompanying drawings in which:

FIG. 3A is a flow chart of processing steps that show in accordance with at least a part of an embodiment of this method how trace data is created upon occurrence of trace event(s) and how the trace data is placed into a trace buffer in the system of FIG. 1;

FIG. 3B is a flow chart of processing steps that show the operation of a Trace Capture Process configured according to embodiments of the invention;

FIG. 9 shows an example of an unraveled captured trace and its relationship with threads built for replay in the system of FIG. 1;

DETAILED DESCRIPTION OF THE PREFERRED EMBODIMENT

Figure 1:
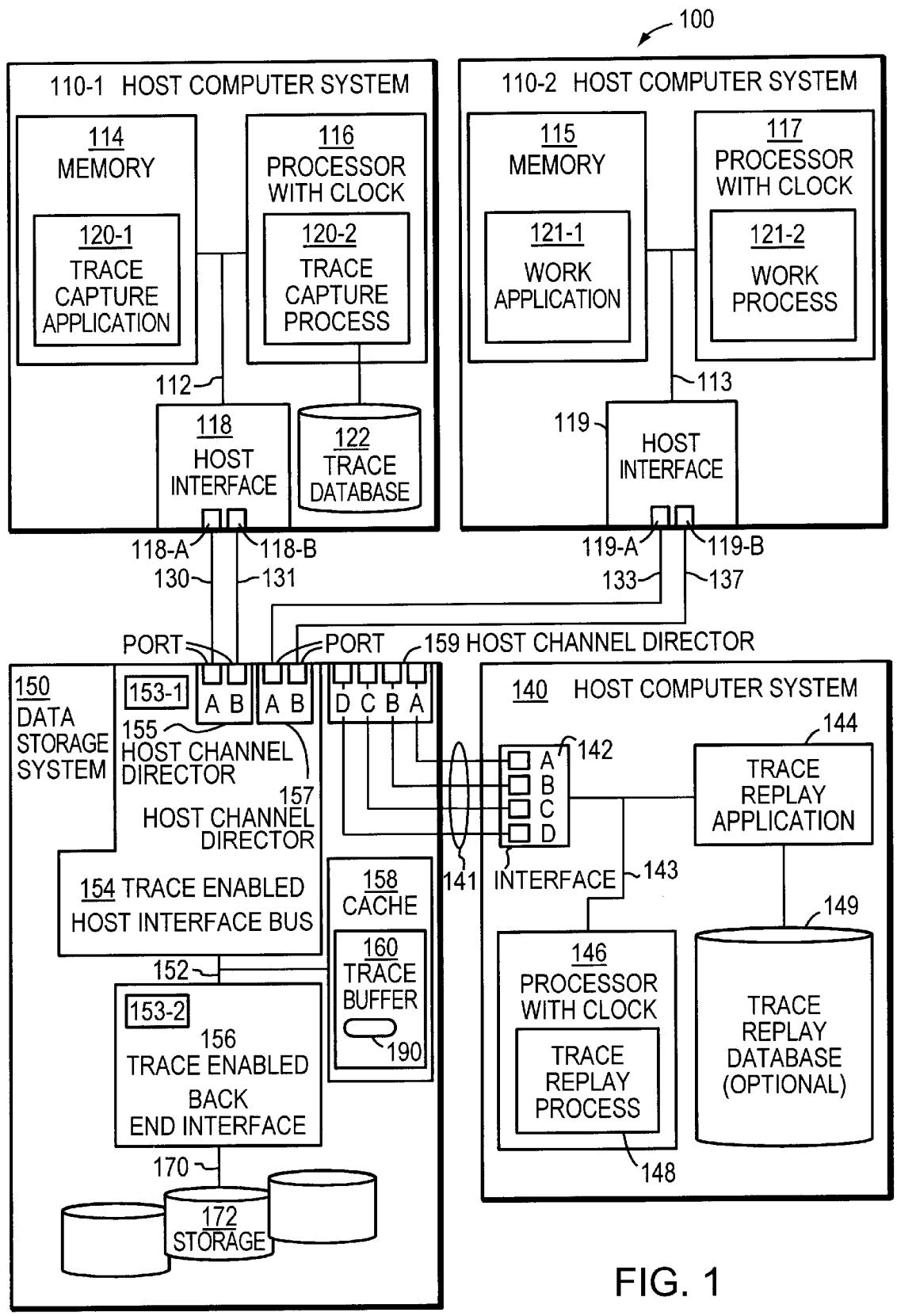
FIG. 1 shows a block diagram schematic of an embodiment of the system of this invention including a data storage system and application and process program logic operating in computer memory for carrying out embodiments of the method of this invention.

Embodiments of the present invention provide a unique system, method, and program product for replaying workload data accessed in a data storage environment for use in testing or for other reasons.

Overview

The invention is directed toward accessing, preparing, and replaying workload data on a data storage system, and includes the ability to access workload data for later replay on the same or a different system. So the first step of the overall embodiment of the method is to create or access a workload. Such accessed data is typically in the form of trace data accessed form I/Os operating on data volumes or logical devices on one or more data storage systems. Logical devices are sometimes interchangeably referred to as data volumes and generally refer to logical representations of physical volumes of data on a physical storage device. A workload trace data accessing system is described in related application Ser. No. 09/794,696 "METHODS AND APPARATUS FOR ACCESSING TRACE DATA" to William Zahavi et al. filed Feb. 26 2001 and assigned to EMC Corporation the assignee of the present application and which is hereby incorporated by reference.

In general, and preferably, for the accessing of data it is extracted to a binary file for processing. The size of the output file, time for carrying out the operation being traced, or the number of I/Os traced desired will control the trace duration.

Once data is accessed in the form of a trace file it is analyzed and unraveled into threads, as described in more detail below so that the threads can be replayed on a data storage system, such as an EMC Symmetrix Data Storage System or Clariion Data Storage System available from EMC Corporation of Hopkinton, Mass. These threads act as I/O activity on the data storage system on which they are played, or in other words, the target data storage system In a preferred embodiment the exemplary data storage system for which workload data is to be captured and played back is a Symmetrix Integrated Cache Disk Arrays available from EMC Corporation of Hopkinton, Mass. However, it will be apparent to those with skill in the art that there this invention is useful with any data storage system. Nevertheless, regarding the preferred embodiment, such a data storage system and its implementation is fully described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

A replay management process receives the threads as input and is able to issue the I/Os for play back on a target. The target may be a data storage systems such as the preferred EMC Symmetric Data Storage System through the proper ports at the proper times.

Overview of Trace Creation or Access Step

The data storage system is equipped with an event trace routine configured according to embodiments of the invention which is able to access trace data and/or trace buffer pointer information for a trace buffer when called upon to do so by the Trace Capture Process. Using the event trace routine, the Trace Capture Process can determine when new trace data is available in the trace buffer in the data storage system, for example, by detecting advancement of a trace buffer pointer. The Trace Capture Process can then use the event trace routine to access (i.e., to read) the trace data in the trace buffer and to obtain an update on the current value of the trace buffer pointer. By keeping track of previous and current trace buffer pointer locations and how frequently the trace buffer pointer changes, the Trace Capture Process can determine exactly how much, and how frequently, trace data is written to or added to the trace buffer during operation (e.g., execution) of a software program in trace mode in the data storage system.

Embodiments of the Trace Capture Process can adjust the frequency or timing between calls to the event trace routine to obtain trace data from the trace buffer at a rate sufficient enough to avoid trace data being overwritten in the trace buffer. The timing between calls to the event trace routine can be adjusted dynamically according to an adaptive timing algorithm which can take into account such factors as the number of events being traced, the amount of trace data created during the occurrence of trace events, and the speed and length of time during which the software program operating in trace mode is allowed to perform. Embodiments of the invention can thus remotely capture trace data over prolonged periods of performance of software programs that operate in trace mode in a data storage system without software developers having to interrupt the software programs in order to manually capture the trace data.

Overview of Replay Process

The replay management process reads trace data, unravels the trace into threads, and manages and dispatches the threads for replay as workload or I/O activity on a target system, e.g. the Symmetrix Data Storage System. On the Symmetrix for example, the process requires that the ports are available or else the user may be able to adjust the work to fit the configuration. Although, for simplicity, the invention embodiments are shown operating with only one host computer, it is intended that I/O from one or more hosts may be accessed, and played back to simulate normal asynchronous traffic experienced in a data storage environment.

An advantage of use of the replay system and process embodiments of this invention is the capability to play back a production scenario without the need to load a database of any kind or duplicate any workload transactions, although an optional database can be used. Bottlenecks will be able to be reviewed and isolated and alternative configurations tested with the exact workload. Further, analysis tools and reports can be integrated with the basic components of the invention to make it a complete I/O benchmarking solution. In addition, multiple traces (from multiple applications) could be combined to test new applications or consolidation of configurations.

Overview of Replay Preparation Process

The replay preparation process takes a trace capture file as input and prepares it for replay. Although, one example, shown and described herein, is to prepare a trace captured and replayed as described with reference to FIGS. 1–12 above, the replay preparation process is useful with traces captured and replayed with other processes. For example, the preparation may be performed with a known capture tool, such as the Sun Solaris TNF trace tool available from Sun Microsystems of Santa Clara, Calif. Generally, preparing a trace capture file for replay includes accounting for the configurations and machine, which the trace needs to run, i.e., the target machine. It then produces files that can be used to replay the trace on the target machine.

The process is capable of aligning I/O's as needed for proper playback on the target machine; mapping I/O's to devices or ports from the source to the target; choosing or filtering activity in view of device or port activity, and changing the I/O or work rate if necessary.

The replay preparation process is particularly useful if the I/O's are to be replayed on a different system but fidelity, i.e., true repeatability of the captured trace on playback needs to be maintained, particularly, in the case of benchmarking. Another issue that must be accounted for when preparing to replay a captured trace on a differently configured system than the source, is an issue of volume size, i.e., the target may logically or physically manage data volumes different in size or number from the source of the trace capture.

An example of a use of the replay preparation process discussed above is benchmarking. Prior art benchmarking approaches in storage industry has one of been running stagnant (canned), idealized, and uniform IO workloads. However, in many cases these benchmarks are not realistic for portraying an actual workload production environment. This invention provides a new methodology for benchmarking storage by replaying exact IO trace of customer traces in different storage hardware and software platforms. This method includes preparing the benchmark workload based on customers real production workload for better, more meaningful results.

The preparation process also allows one to prepare data for replay for improving performance by implementing on preparation alternative algorithms and then playing them back. Along similar lines, the preparation process allows preparation of playback data that can be analyzed for consolidation, i.e. merging one or more storage systems into another number of storage systems, or capacity planning, i.e. determining needs for handling workload. It would also be advantageous if such an invention could be used for consolidation and capacity planning, i.e., allowing engineers to size new implementations with workload data collected from existing storage implementations. Further the preparation process could be used for problem recreation and troubleshooting by replaying prepared data.

System Architecture of an Embodiment Useful for Capturing and Replaying Trace Data FIG. 1 illustrates an example of a computing system environment 100 configured in accordance with embodiments of the invention. The computing system environment 100 includes a host computer system 110-1 and 110-2 coupled via data interface lines 130, 131, 133 and 137, respectively as shown, to data storage system 150.

The host computer system 110-1 includes an interconnection mechanism 112 coupling a memory 114, a processor with clock 116, a host interface 118. The memory 114 is encoded with logic instructions such as software application code and/or data which collectively form a trace capture application 120-1 configured in accordance with embodiments of the invention. The processor 116 can access the logic instructions that form the trace capture application 120-1 via the interconnection mechanism 112 to the memory 114 in order to perform (e.g., execute, run, interpret or otherwise operate) such logic instructions. When this happens, a Trace Capture Process 120-2 is formed via the combination of the logic instructions of the trace capture application 120-1 operating on the processor 116. In other words, the trace capture application 120-1 represents an embodiment of the invention in a computer readable medium such as the memory 114, which includes logic instructions that when performed on the processor 116, provide an embodiment of the invention referred to herein as the Trace Capture Process 120-2. During operation, the Trace Capture Process 120-2 can access a trace database 122 in order to store trace data, as will be explained.

The host computer system 110-2 includes an interconnection mechanism 112 coupling a memory 115, a processor with clock 117, and a host interface 119. The memory is encoded with logic instructions such as software application code and/or data that collectively form a workload application 121-1. The processor can access the logic instructions that form the workload via the interconnection mechanism 121 to the memory in order to perform (e.g., execute, run, interpret or otherwise operate) such logic instructions. When this happens, a workload process 121-2 is formed via the combination of the logic instructions of the application operating on the processor.

The I/O activity from the hosts is directed over respective host interfaces 118 and 119 and their respective host bus adapters (HBA's) 118A–B, and 119A–B to respective host channel directors 155 and 157 and their respective ports 155A–B and 157A–B. Later I/O activity can be replayed over the same ports, or simulating ports, such as 159A, B, C, and D that could emulate the other four ports mentioned above if needed for some reason.

Host computer 140 includes an interconnection mechanism 143 coupling a memory 145, a processor with clock 146 and a host interface 142 having HBA's 142A–B. The memory is encoded with logic instructions such as software application code and/or data that collectively form a Trace Replay Application 144 configured in accordance with embodiments of the invention. The processor with clock 146 can access the logic instructions that form the trace replay application via the interconnection mechanism to the memory in order to perform (e.g., execute, run, interpret or otherwise operate) such logic instructions. When this happens, a Trace Replay Process 148 is formed via the combination of the logic instructions of the replay application operating on the processor. In other words, the Trace Replay Application represents an embodiment of the invention in a computer readable medium such as the memory, which includes logic instructions that when performed on the processor, provide an embodiment of the invention referred to herein as the Trace Replay Process. During operation, the Trace Replay Process can replay threads that duplicate I/O activity form a captured trace as explained below.

Figure 12:
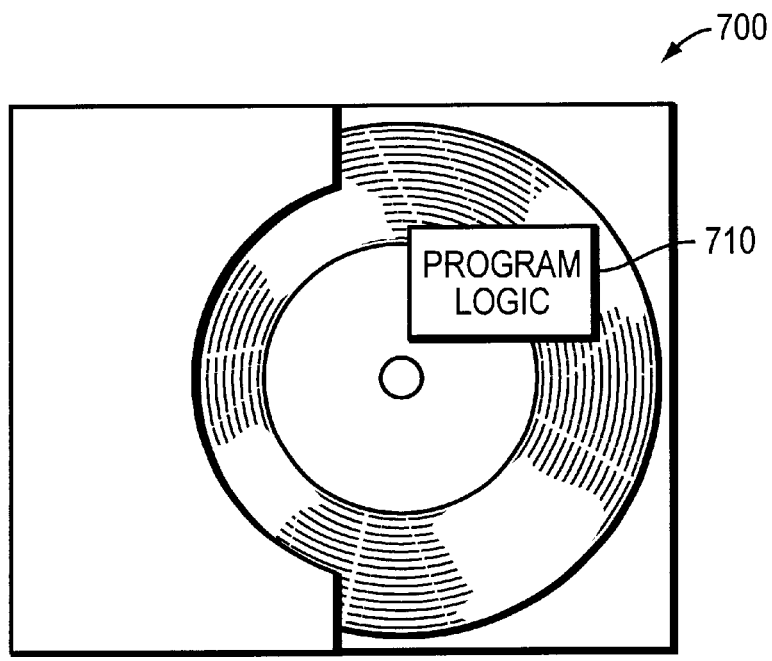
FIG. 12 is a computer program product including a computer-readable memory having program logic configured for enabling an embodiment of the method of this invention.

FIG. 12 shows a computer readable medium 700 including program logic 710 configured for carrying out one or more of the embodiments of the processes and method steps described herein, and may include all or part thereof of processes 120-1, 147 or 148 (discussed below). The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operate analogously to specific logic circuits.

Figure 2:
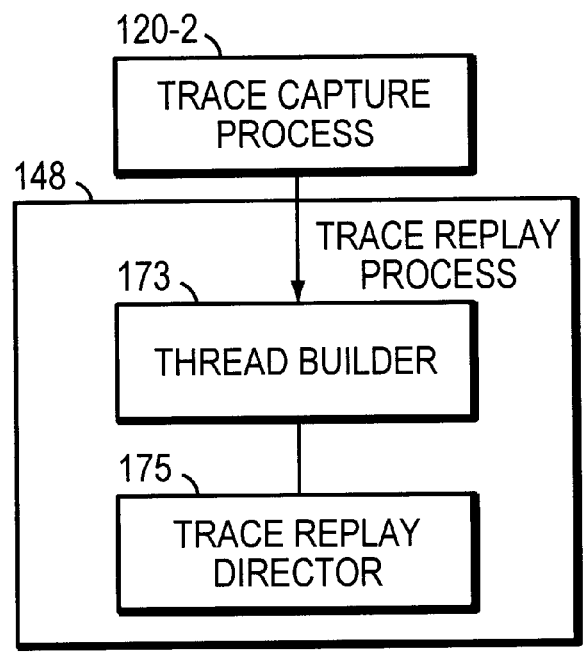
FIG. 2 shows a schematic block diagram overview of the functional relationship of the Trace Capture Process and the trace replay process that operate as an embodiment of the method of this invention with the embodiment of the system shown in FIG. 1.
Figure 8:
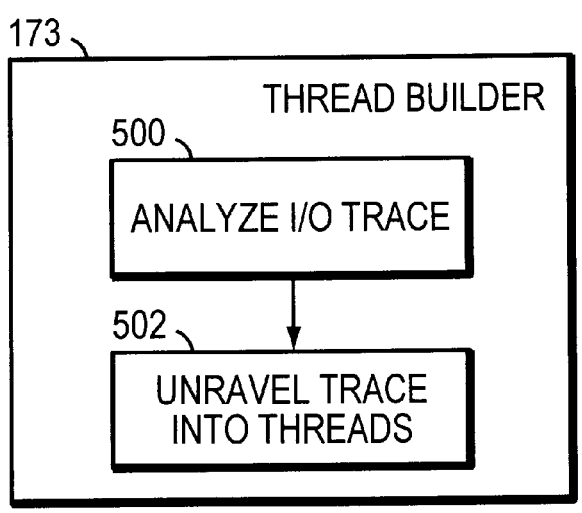
FIG. 8 shows a schematic block diagram of the trace builder which is part of the trace replay process shown in FIGS. 1 and 2.

Reference is now made to FIGS. 2 and 8 below. Referring to FIG. 2, an overview of processes of the invention are shown. The Trace Capture Process 120-2 typically precedes the Trace Replay Process 148. The Trace Replay Process 148 includes a thread builder 173 and the Trace Replay Director 175. Referring to FIG. 8, the Thread Builder 173 performs step 500: analyzing an I/O trace, and step 502: an unraveling of I/O trace data into threads. The trace is unraveled into threads, which can then be used by host 140 to carry out the Trace Replay Process 148 that plays back I/O activity on the data storage system.

Returning to the aspect of capturing the trace data, reference is once again made to FIG. 1. The data storage system 150 includes an interconnection mechanism 152 which couples a trace enabled front end interface 154, a trace enabled back end interface 156 and a cache 158 (e.g., a cache memory system). In this example embodiment, the cache 158 is encoded with a trace buffer 160 (e.g., a data structure) which is able to store trace data 190. The trace enabled back end interface 156 includes a coupling 170 to one or more storage devices 172 which may be disk drives, tape drives, or any other storage media. According to the general operation of the data storage system 150, the trace enabled front end interface 154 couples to the data interface 130 to process data access requests (not specifically shown) on behalf of host computer systems (e.g., 110 and others, not specifically shown) for access to data stored within the data storage system 150. The trace enabled back end interface 156 handles data access operations related to data stored within the storage devices 172. An example implementation of the data storage system 150 is a Symmetrix data storage system manufactured by EMC Corporation of Hopkinton, Mass., USA.

The trace enabled front end interface 154 and the trace enabled back end interface 156 are called "trace enabled"

interfaces since each represents at least one processor which can perform a respective software program 153-1, 153-2 that can each operate in trace mode to produce the trace data 190 within the trace buffer 160. For purposes of the descriptions of embodiments of this invention, it is not particularly important which processor (one or more) operating a software program 153 (e.g., 153-1 or 153-2) within the data storage system 150 produces the trace data 190 in a trace buffer 160. To this end, the software programs 153-1 and 153-2 may be different and may operate separately or together to produce trace data 190 separately or concurrently. In this example then, such trace data 190 may be produced and placed into the trace buffer 160 from either the front end or back end interfaces 154 or 156. It is to be understood that these processors 154, 156 operating the software programs 153-1, 153-2 are illustrative only and that any processor within any component (e.g., a processor operating perhaps within a storage device 172) in the data storage system 150 may produce the trace data 190 in the trace buffer 160.

FIG. 2A is a flow chart of processing steps which show the general operation of a software program 153 operating on a processor such as the trace enabled front end and/or back end interface processors 154, 156 to produce trace data 190 within the trace buffer 160.

In step 200, the software program 153 detects a trace event. The trace event may be any event or operation within the software program 153 for which a software developer has designated that a trace routine (not specifically shown) that is to operate upon detection of the trace event to produce trace data 190.

Next, in step 201, the software program 153, via operation of a trace routine associated with the trace event, places the trace data 190 into the trace buffer 160.

In step 202, the software program 153 advances a trace buffer pointer (not specifically shown in FIG. 1) from a previous trace buffer pointer location to a current trace buffer pointer location indicating the end of the trace data 190 within the trace buffer 160. As will be explained shortly, trace routines which are responsible for detecting trace events and capturing trace data for placement into the trace buffer 160 are able to update the trace buffer pointer which points to, or otherwise indicates a location at which to place trace data 190 into the trace buffer 160 upon the occurrence of each trace event. The software program 153 thus updates the trace buffer pointer in step 202 and then returns to step 200 in order to detect the next occurrence of another trace event.

In this manner, a software program 153 operating in trace mode within the data storage system 150 is able to operate, and upon occurrence of user specified events, can trigger a trace routine to place the trace data 190 into the trace buffer 160. Using embodiments of the invention which will be explained next, the processing operations shown in FIG. 2A can continue for prolonged periods of time without concern for filling the trace buffer 160 with excessive amounts of trace data 190.

FIG. 2B is a flow chart of processing steps, which show the general processing operations provided by a Trace Capture Application 120-1 (FIG. 1) when performing (e.g., executing) on the processor 116 as the Trace Capture Process 120-2. In other words, the processing steps in FIG. 2B show the general operation of the Trace Capture Process 120-2, which provide access to the trace data 190 from the host computer system 110.

In step 205, the Trace Capture Process 120-2, which is typically under the control of a software test developer (not shown), establishes trace events (not specifically shown) for which the software program 153 will trigger a trace routine. By way of example, a software developer may be interested in analyzing the performance of the trace enabled front end interface 154 while handling SCSI commands over the data interface 130. Since the software program 153-1 in the data storage system 150 is responsible for controlling the general operation of the trace enabled front end interface 154, the software developer might perhaps establish one or more trace events related to the processing of SCSI commands by the software program 153-1. As a specific example, the software developer might establish a trace event to capture trace data related to SCSI interface Command Descriptor Blocks (CDBs) which are transferred across the data interface 130 between host computer system(s) and the data storage system 150.

Next, in step 206, the software developer activates event tracing by starting software programs 153-1 and 153-2 in trace mode on the data storage system 150 followed by the Trace Capture Process 120-2 on the host computer 110. The aforementioned procedure causes the software program 153-1 to perform using the processing and functionality described above with respect to FIG. 2A.

As the software program 153-1 operates in trace mode (i.e., operates with event tracing activated), trace data 190 will, at some point during the operation of the software program 153-1, begin to appear in the trace buffer 160. The exact time and rate at which the trace data 190 appears in the trace buffer 160 may be determined by a number of factors such as the number of trace events that the software developer establishes, the frequency of occurrence of trace events, the speed at which the software program 153 performs, the amount of trace data 190 that a trace routine captures for a particular trace event, and possibly other factors. For example, if a software developer establishes trace events for processing operations which frequently occur within the software program 153 and these operations are frequently exercised during performance of the software program 153 in trace mode, then it is likely that trace data 190 will rapidly appear within the trace buffer 160. Conversely, if trace events are established for certain processing tasks which are rarely encountered during normal operation of the software program 153, trace data 190 may appear in the trace buffer 160 less frequently.

In step 207, the Trace Capture Process 120-2 detects availability of trace data 190 in the trace buffer 160. There are a number of techniques which embodiments of the invention can provide to perform the detection of trace data 190 which appears in the trace buffer 160. Details of certain of such mechanisms and techniques will be explained shortly.

In step 208, the Trace Capture Process 120-2, in response to detecting availability of trace data 190 in the trace buffer 160, requests the trace data 190 from the trace buffer 160 within the data storage system 150. In a preferred embodiment of the invention, such a request for the trace data 190 in step 208 is performed using a system call to an event trace routine provided by embodiments of the invention (not specifically shown in FIG. 1) that operates within the data storage system 150 to access (e.g., read) the trace data 190 from the trace buffer 160.

In response to the request made to the Trace Capture Process 120-2 in step 208, the event trace routine operating in the data storage system 150 accesses the requested trace data 190 (as will be explained) and then passes back or returns the trace data 190 to the Trace Capture Process 120-2 via the data interface 130 interconnecting the host computer system 110 in the data storage system 150.

At this point, in step 209, the Trace Capture Process 120-2 receives the trace data 190 accessed via the event trace routine from the trace buffer 160 in the data storage system 150.

In step 210, the Trace Capture Process 120-2 stores the trace data 190 in the trace database 122 for analysis of the performance of the software program 153 for which the trace data 190 was produced. After processing the functionality shown in step 210, the Trace Capture Process 120-2 repeats the aforementioned processing by returning to step 207 to begin again the process of detecting availability of new trace data 190 placed into the trace buffer 160.

The Trace Capture Process 120-2 thus can continually repeat the processing of steps 207 through 210 in order to extract trace data 190 continuously and remotely as it is entered or added into the trace buffer 160 during operation of the software program 153 in trace mode. Since the Trace Capture Process 120-2 in this embodiment operates within the host computer system 110, there is little interference or disruption within normal operation of the software program 153 operating in trace mode. To this end, the repetitive processing operations shown in steps 207 through 210 shown in FIG. 2B preferably operate concurrently and asynchronously with the software program 153 operating in trace mode, which concurrently performs the processing operations 200 to 202 shown in FIG. 2A and as explained above. It is to be understood, however, that the Trace Capture Process 120-2 can, in certain embodiments, be implemented and operated on a processor within the data storage system 150 in order to capture trace data 190 locally. The processor may happen to be the same processor that operates the software program 153 that generates the trace data 190.

FIG. 3 illustrates a more detailed example of the internal operation and interaction between a trace enabled front end interface 154 and a cache 158 containing a trace buffer 160 as operating according to embodiments of the invention. As illustrated, the trace enabled front end interface 154 includes a front end processor 156 which performs (e.g., executes, interprets, runs or otherwise operates) the software program 153-1, which in this example is front end microcode or logic instructions which control the general operation of the front end interface 154. The software program 153-1 includes or otherwise has access to (e.g., can call) trace routines 165 which include an event trace routine 300 configured according to embodiments of the invention.

As explained above with respect to FIG. 1, the Trace Capture Process 120-2 (FIG. 1) can generate a system call 240 to the event trace routine 300. In this example, the system call 240 to the event trace routine 300 includes two parameters: a trace buffer pointer, and an amount of data to read from the trace buffer. When the Trace Capture Process 120-2 generates the system call 240 to the event trace routine 300, the event trace routine 300 processes the system call 240, as will be explained in FIG. 6, and returns a response 250 which includes a current value of the trace buffer pointer, and optionally, as will also be explained, trace data 190.

Attention is directed now to FIG. 3 and specifically to the interaction between event trace routine 300 and the cache 158 containing the trace buffer 160. In this example, the trace buffer 160 includes a plurality of trace buffer locations 162-1 through 162-N. Each trace buffer location 162 is capable of storing trace data 190. In this example, which illustrates the state of the trace buffer 160 after operation of the software program 153-1 after some period of time during which trace events have previously occurred, trace buffer locations 162-1 through 162-7 contain (i.e., store) respective portions of trace data 190-1 through 190-7. At the state of processing as illustrated in this figure, trace buffer locations 162-8 through 162-N do not yet contain trace data and are thus indicated as being EMPTY.

FIG. 3 also illustrates various trace buffer pointers 230-1 through 230-4. The trace buffer pointers 230 illustrated in this example represent the point of entry (i.e., the starting points and ending points) of various amounts (i.e., multiple portions) of trace data 190 which have been incrementally written to the trace buffer 160 during operation of the software program 153-1. The illustration shown in FIG. 3 thus represents a snapshot of the trace buffer 160 as it appears a point in time after a certain amount of processing has occurred in the software program 153-1 while performing on the front end processor 156.

By way of example, the first trace buffer pointer 230-1 represents the first location of the trace buffer pointer as of the start of the trace mode operation of the software program 153-1. While not shown here, at the start of the trace mode operation of the software program 153-1, all of the trace buffer locations 162 were empty. At some point into the processing operation of the software program 153-1 (i.e., during operation of the processing in FIG. 2A), upon the occurrence of the first trace event, a trace routine 165 placed or wrote the portions of trace data 190-1 and 190-2 into the respective trace buffer locations 162-1 in 162-2 and also advanced the location of the trace buffer pointer to the position at 230-2. As the software program 153-1 progressed further, another trace event occurred causing a trace routine 165 to place the portions of trace data 190-3 through 190-5 into the respective trace buffer locations 162-3 through 162-5 and further caused the advancement of the trace buffer pointer to the location 230-3. Finally, to arrive at the configuration illustrated in FIG. 3, the software program 153-1 continued to operate and encountered another trace event which caused the trace routine 165 to place portions of trace data 190-6 in 190-7 into respective trace buffer locations 162-6 in 162-7 and caused the advancement of the trace buffer pointer 230 to trace buffer pointer location 230-4, which in this example configuration is also called the current trace buffer pointer 230-C, as this is the last trace buffer location 162 which has received a portion of trace data 190. With respect to the location of any trace buffer pointer 230, a previous trace buffer pointer for purposes herein is the trace buffer pointer 230 that immediately proceeds (i.e., that is less than) the current trace buffer pointer 230-C.

Generally, according to the operation of embodiments of the invention, the event trace routine 300 is able to access to trace buffer 160 within the cache 158 in response to a system call 240. The event trace routine 300 can then access or obtain a current value or position of the trace buffer pointer 230, as well as the portions of trace data 190 within trace buffer locations 162 as specified in the system call 240. The Trace Capture Process 120-2 can use the particular trace buffer pointer locations 230 (as returned in response 250 to the systems calls 240) to sequentially access trace data 190 with each successive system call 240 to the event trace routine 300, as illustrated by the system call numerals 240-0 through 240-3 in FIG. 3.

Figure 4:
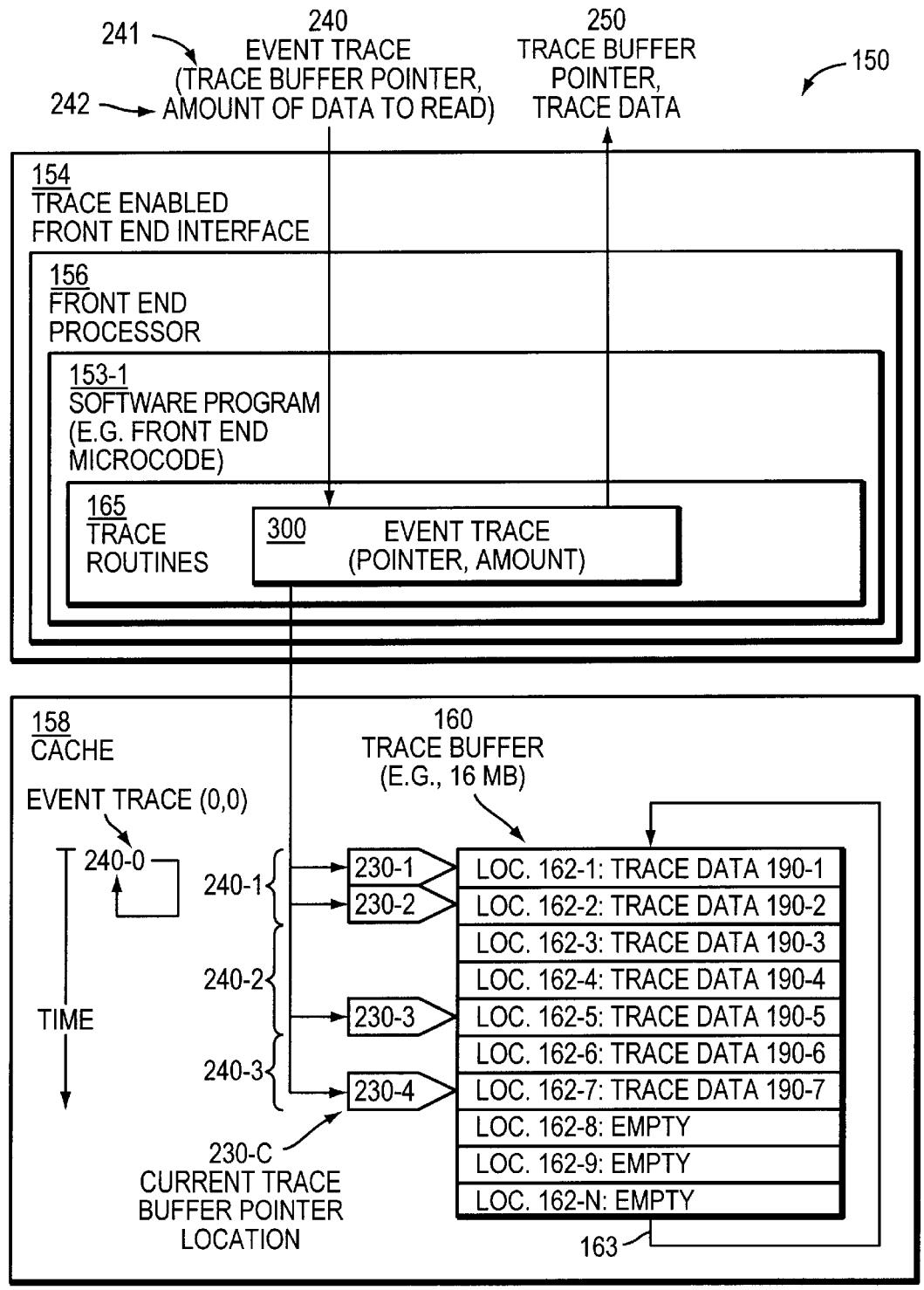
FIG. 4 illustrates a more detailed example of interaction between a Trace Capture Process, an event trace routine and a trace buffer within a cache memory in a data storage system configured according to embodiments of the invention.

FIG. 4 is a flow chart of processing steps, which shows details of an operation of an example embodiment of the Trace Capture Process 120-2 on a host computer system 110 (and thus also illustrates a representation of the logic instructions which form the Trace Capture Application 120-1 in FIG. 1 according to an embodiment of the invention).

Generally, the processing steps shown in FIG. 4 represent additional details of the general processing cycle shown in steps 207 through 210 in FIG. 2B. For the operations or steps in FIG. 4 however, it is assumed that a software developer has already performed steps 205 and 206 in FIG. 2B to establish the trace events and to activate event tracing within the software program 153-1, which is now operating in trace mode according to the processing shown in FIG. 2A. The steps in FIG. 4 will be explained in part with reference to the example configuration of the data storage system 150 shown in FIG. 3.

In step 400, the Trace Capture Process 120-2 initializes a current trace buffer pointer variable and a previous trace buffer pointer variable to a null value such as zero. The Trace Capture Process 120-2 in the host computer system 110 maintains previous and current trace buffer pointer variables (not shown in the illustrations in FIG. 1 or 3) in order to be able to determine when and how much trace data 190 is added to the trace buffer 160 in a data storage system 150.

In steps 401 through 404, the Trace Capture Process 120-2 generally detects the availability of trace data 190 in the trace buffer 160 by querying the data storage system 150 to determine if any trace data 190 has been placed into the trace buffer 160 (e.g., since the last query). If trace data has been placed in the trace buffer, the Trace Capture Process 120-2 proceeds to access the trace data 190, whereas if trace data 190 has not been placed into the trace buffer 160, the Trace Capture Process 120-2 waits a predetermined amount of time and repeats the process of steps 401 through 404.

More specifically, in step 401, the Trace Capture Process 120-2 can query the data storage system 150 by providing a request for a value of the current trace buffer pointer 230-C (FIG. 3), for example, by activating the system call 240-0 (FIG. 3) to the event trace routine 300 that performs in the data storage system 150. For each system call 240-0 in step 401, the trace buffer pointer parameter 241 (FIG. 3) is set to "0" and the amount of data to be read parameter 242 also set to "0". As will be explained, when the event trace routine 300 is activated with a system call 240 (e.g., 240-0) with at least one of the parameters 241, 242 set to "0" (e.g., preferably, and in this particular example, the amount of data to read parameter 242 is set "0"), then the event trace routine 300 only returns the current value of the trace buffer pointer 230-C and returns no trace data 190. In this manner, the event trace routine 300 can be called by the Trace Capture Process 120-2 to obtain the value of current trace buffer pointer 230-C without actually returning trace data 190.

Next, in step 402, the Trace Capture Process 120-2 determines if the value of the current trace buffer pointer variable equals the value of the previous trace buffer pointer variable. Recall that in step 400, both the current trace buffer pointer and previous trace buffer pointer variables were initialized to "0." Accordingly, if in step 401, the system call 240-0 (FIG. 3) to the event trace routine 300 obtains a value of the current trace buffer pointer variable other than "0," then this is an indication that trace data 190 was added to the trace buffer 160. If the current trace buffer pointer equals the previous trace buffer pointer in step 402, then no advancement of the current trace buffer pointer 230 (FIG. 3) has taken place in the cache 158 and thus no trace data 190 has been placed in the trace buffer 160 at this point and processing proceeds to step 403.

In step 403, the Trace Capture Process 120-2 waits (e.g., performs a delay process operation) a predetermined time period dynamically determined by an adaptive timing algorithm before proceeding back to step 401 to query the trace buffer point again.

An adaptive timing algorithm according to embodiments of the invention generally controls the frequency at which the Trace Capture Process 120-2 accesses trace data 190 from the trace buffer 160 based on detecting advancement of the trace buffer pointer. The frequency or rate at which such trace data accesses occur can be based on factors such as the speed of operation of the software program 153-1, the number of events selected for tracing, the frequency of occurrence of the events being traced, and the amount of trace data 190 placed into the trace buffer upon each advancement of the trace buffer pointer, among other factors.

By way of example, the Trace Capture Process 120-2 can determine the amount of trace data 190 placed into the trace buffer 160 for use by the adaptive timing algorithm by comparing any difference that may exist between the previous and current trace buffer pointer variables. If such a difference exists, the difference (e.g., in bytes, blocks, memory locations, or the like) represents the amount of trace data added or written to the trace buffer 160 since the last operation of accessing trace data 190 by the Trace Capture Process 120-2.

The adaptive timing algorithm can use, for example, the amount of trace data placed into the trace buffer as a guide for governing the frequency at which the trace data 190 should be accessed from the trace buffer 160. For example, if the difference between the previous and current trace buffer pointer variables is a large, then a large amount of trace data 190 has been added to the trace buffer 160 by the software program 153-1 operating in trace mode. Accordingly, the adaptive timing algorithm may determine that a shorter wait time period or delay should be used between successive accesses of trace data 190 in the trace buffer 160 in order to ensure that all trace data 190 is extracted and to avoid newer trace data being overwritten onto older trace data that might not yet have been accessed. Alternatively, if the difference between the previous and current trace buffer pointer variables is relatively small, this indicates that a small amount trace data 190 was placed into the trace buffer 160. Thus, the adaptive timing algorithm can increase the wait time period between successive accesses of trace data 190.

While not specifically shown, embodiments of the invention can use an adaptive timing algorithm that keeps a histogram of the relative sizes or amounts of trace data that are placed into the trace buffer 160 upon each iteration of step 403. Using such a histogram, the adaptive timing algorithm can detect patterns of increasing or decreasing amounts of trace data being placed into the trace buffer over prolonged periods of time during which the software program 153 operates and can adjust the wait time period accordingly. If an increase in an amount of trace data exceeds a predetermined amount of data over a predetermined time period, the adaptive timing algorithm can decrease the time period with which to wait in step 403 before continuing processing, whereas a decrease in the amount of trace data may cause the adaptive timing algorithm to increase the predetermined time period with which to wait in step 403 before proceeding.

Example amounts of time to wait between successive queries of the value of the current trace buffer pointer (i.e., the time period with which to wait in step 403) might be one second or more while amounts of trace data 190 being added to the trace buffer 160 are relatively small, while shorter amounts of time, such as one-quarter second or less, may be used in step 403 if trace events happen rapidly or if amounts of trace data 190 become larger. Once the time period elapses as determined by the adaptive timing algorithm, processing proceeds from step 403 to step 404.

In step 404, the Trace Capture Process 120-2 then sets the previous trace buffer pointer equal to the current trace buffer pointer and processing returns to step 401 in order to repeat the process of querying the data storage system 150 to determine if trace data 190 has been placed in the trace buffer 160.

In this manner, the Trace Capture Process 120-2 can perform successive iterations of steps 401 to 404 to detect advancement of the trace buffer pointer 230 within the cache 158 of the data storage system 150. Once the current trace buffer pointer value differs from a previous trace buffer pointer value (as maintained by the Trace Capture Process 120-2), processing proceeds to steps 405 to 410 in order to have the Trace Capture Process 120-2 access the trace data 190 that has been added to the trace buffer 160.

In particular, in step 405, the Trace Capture Process 120-2 first performs a check to determine if the value of the current trace buffer pointer variable is less than (<) the value of the previous trace buffer pointer variable. Essentially, step 405 causes the Trace Capture Process 120-2 to check for the special case or possibility that trace data 190 may have been written (i.e., by the software program 153-1 operating in trace mode to cause trace routines 165 to place the trace data 190 into the trace buffer 160) to the trace buffer 160 in an amount which exceeds or goes beyond the end of the trace buffer 160. For purposes of the explanation of processing up to this point, assume that the value of the current trace buffer variable is not less than the value of the previous trace buffer pointer variable. In other words, assume that at this point in processing, the current trace buffer pointer 230-C is ahead of (i.e. is greater than) the previous trace buffer pointer in the trace buffer 160. As such, Trace Capture Process 120-2 processing proceeds to step 408.

In step 408, the Trace Capture Process 120-2 determines an amount (e.g., a number of bytes) of trace data 190 that has been written to the trace buffer 160. In this example embodiment, a variable "SIZE_OF_TRACE_DATA" is set equal to the value of the current trace buffer pointer variable minus the value of the previous trace buffer pointer variable. The difference between these trace buffer pointer values reflects the amount of trace data 190 added to the trace buffer 160. Once this amount of trace data 190 is determined, processing proceeds to step 409.

In step 409, the Trace Capture Process 120-2 provides a request for the trace data 190 in the trace buffer 160. This is done in this embodiment via a system call 240 to the event trace routine 300. The parameter value 241 (i.e., a trace buffer pointer value) used in the system call 240 to the event trace routine 300 in step 409 contains the value of the previous trace buffer pointer variable, while the parameter value 242 for the amount of data to read from the trace buffer 160 contains the value of the parameter SIZE_OF_TRACE_DATA, as determined in step 408 explained above. In this manner, the call 240 to the event trace routine 300 in step 409 causes the event trace routine 300 to read an amount of trace data 190 as specified by the parameter SIZE_OF_TRACE_DATA beginning in a trace buffer location 162 determined by the value of the previous trace buffer pointer variable. As will be explained shortly, the request for trace data provided to the data storage system 150 in this manner causes the event trace routine 300 to return the requested trace data 190 from the trace buffer 160 to the Trace Capture Process 120-2 in response to the request. In step 409, once the trace data 190 is received (i.e., via response 250 in FIG. 3) by the Trace Capture Process 120-2, processing proceeds to step 410 in FIG. 4.

In step 410, the Trace Capture Process 120-2 stores the trace data 190 obtained in step 409 into the trace database 122. At this point, the processing of the Trace Capture Process 120-2 proceeds back to step 403 and 404 at which point the previous trace buffer pointer variable gets set equal to the current trace buffer pointer variable.

In this manner, returning to step 404 causes the previous trace buffer pointer variable in the Trace Capture Process 120-2 to always remain up-to-date with the most recent value of the current trace buffer pointer variable, once the trace data 190 existing in the trace buffer 160 between these pointer values has been obtained (i.e., has been read) in step 409. That is, once the Trace Capture Process 120-2 obtains any trace data 190 that exists in the trace buffer 160 between the previous and current values of the trace buffer pointer, the previous value of the trace buffer pointer is set to the current value of the trace buffer pointer and the Trace Capture Process 120-2 returns to the iterative processing of steps 401 through 404 in order to detect further advancement of the current trace buffer pointer.

Using these processing techniques, embodiments of the invention can periodically detect advancement of the trace buffer pointer which indicates that trace data has been added to the trace buffer 160. Upon such a detection, the Trace Capture Process 120-2 can determine how much trace data 190 has been added based on its knowledge of the previous value of the trace buffer pointer in comparison to the current value of the trace buffer pointer. The Trace Capture Process 120-2 can then use the event trace routine 300 via a system call 240 which indicates to the event trace routine 300 exactly how much trace data 190 is to be read from the trace buffer 160, beginning at the location corresponding to the previous trace buffer pointer (and extending in length up to the current trace buffer pointer). Once the trace data 190 has been obtained via this technique, the Trace Capture Process 120-2 can update the previous trace buffer pointer value to be equal to the current trace buffer pointer value and can then proceed to detect another advancement of the trace buffer pointer. This processing repeats itself such that trace data 190 is continually extracted from the trace buffer 160 in an automated manner.

The frequency at which this processing occurs can be controlled, as explained above, by an adaptive timing algorithm which waits a time period between accesses to trace data 190 to allow for extraction of the trace data 190 from the trace buffer 160 in substantially a real-time manner. That is, the faster that the software program 153-1 performs and/or encounters trace events which cause the creation of trace data 190 in the trace buffer, the faster the Trace Capture Process 120-2 performs iterations of the processing shown in FIG. 4.

Returning attention now briefly back to the example configuration illustrated in FIG. 3, the general operation of the processing shown in FIG. 4 will be explained in relation to the example occurrences of events as illustrated by trace buffer pointer positions 230.

Upon the start of the processing in FIG. 4, the trace buffer pointer 230 begins at location 230-1 and the trace buffer 160 is empty. As the software program 153-1 operates in trace mode and begins to place portions of trace data 190 into the trace buffer 160, the processing steps 401 through 404 detect the first addition of trace data 190 into the trace buffer 160 by advancement of the trace buffer pointer from position 230-1 (value saved as the previous trace buffer pointer) to position 230-2 (value of a current trace buffer pointer at this point in processing). The repetitive system calls 240-0 illustrated in FIG. 3 show how the event trace routine 300 can be used in this manner to detect advancement of the trace buffer pointer. After each advancement of the trace buffer pointer from 230-1 to 230-2, then from 230-2 to 230-3, and then from 230-3 to 230-4, step 401 detects the change of the current trace buffer pointer value from the previous trace buffer pointer value and processing proceeds from step 402, through step 405, to step 408 which computes the size, or amount, of trace data 190 added to the trace buffer 160. Step 409 then requests and receives (i.e., accesses or reads) the relevant portions of trace data 190 and also obtains the most recent value for the current trace buffer pointer 230. Once the trace data is stored, step 403 resets the previous trace buffer pointer value and the process repeats to detect the next advancement of the trace buffer pointer.

Returning attention now to processing step 405, eventually, as more and more trace data 190 is added to the trace buffer 160 during trace mode operation of the software program 153-1, the portions of trace data 190 will reach the end of the trace buffer 160 (i.e., will be written to the trace buffer location 162-N and then back to location 162-1). When this happens, the trace routines 165 (FIG. 3) begin writing new trace data 190 over older portions of trace data (e.g., trace data portions 190-1, 190-2, and so forth) at the start of the trace buffer 160.

Figure 6:
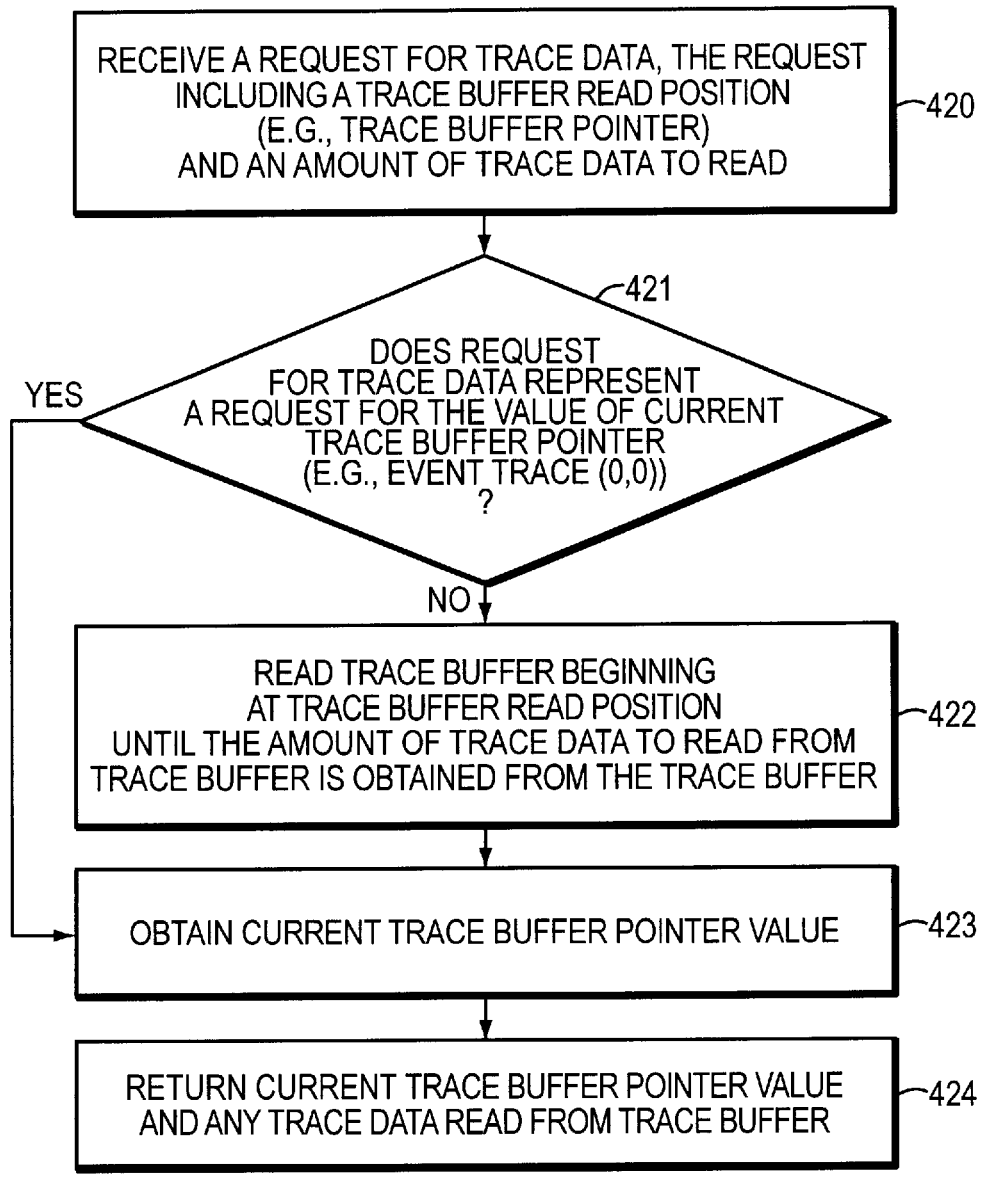
FIG. 6 is a flow chart of processing steps that show the operation of an event trace routine in a data storage system configured according to embodiments of the invention to access trace buffer pointer information and trace data in a trace buffer.
Figure 7:
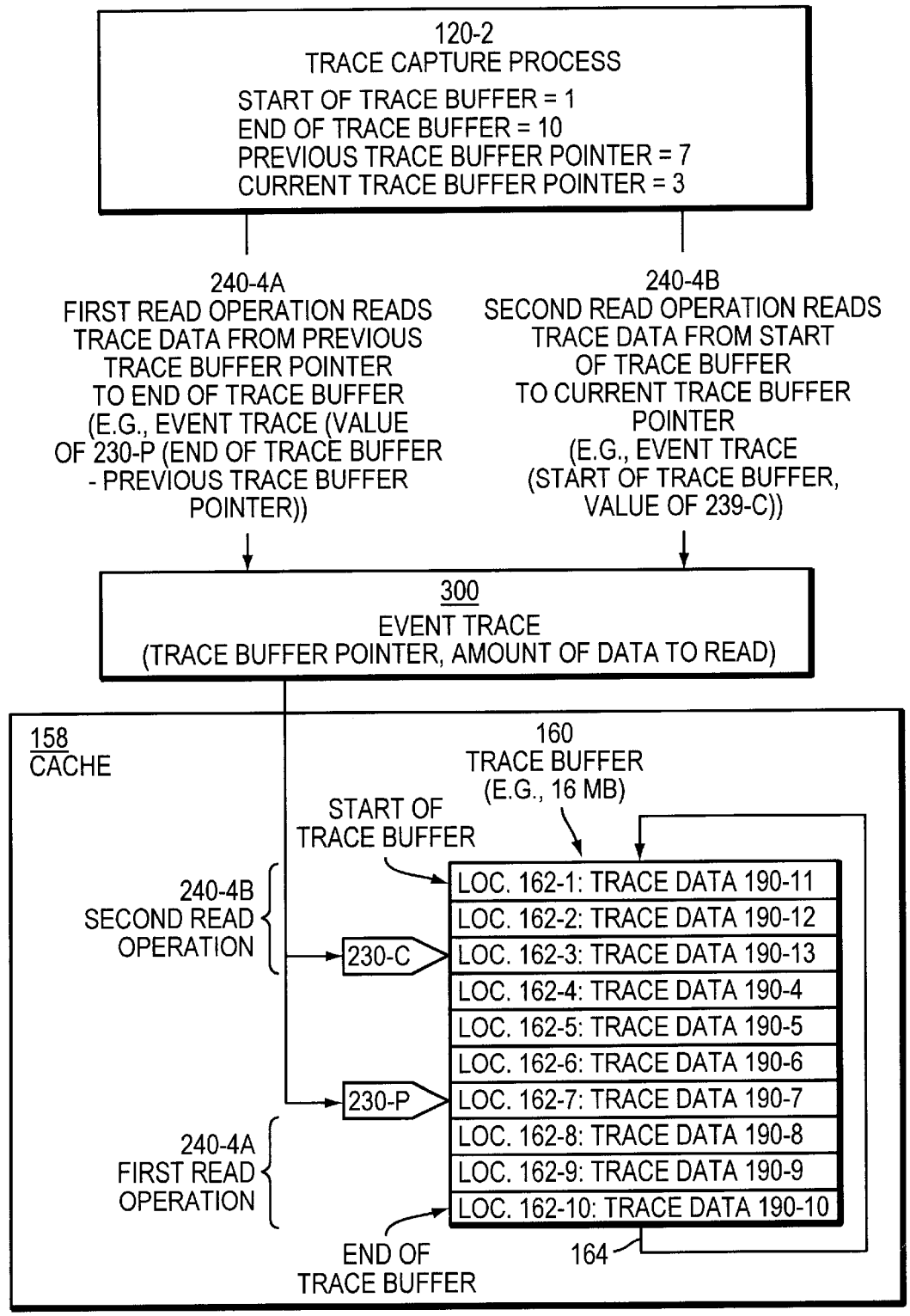
FIG. 7 illustrates an example interaction between a Trace Capture Process, an event trace routine, and a trace buffer in which newer trace data has overwritten older trace data in the trace buffer.

FIG. 6 illustrates an example of this scenario in which the trace buffer 160, as it existed in FIG. 3, subsequently receives, via an occurrence of a trace event during trace mode operation of the software program 153-1, portions of trace data 190-8 through 190-13. Recall that the trace buffer 160 is a circular trace buffer. As such, since that are six portions of trace data 190-8 through 190-13, the trace routines 165 that generate the portions trace data 190-8 through 190-13 write the first three portions of trace data 190-8 through 190-10 into the trace buffer locations 162-8 through 162-10, while the remaining three portions of trace data 190-1 1 to 190-13 are written into the trace buffer 160 beginning at the start of the trace buffer 160 (i.e., into trace buffer locations 162-1 through 162-3).

Figure 5:
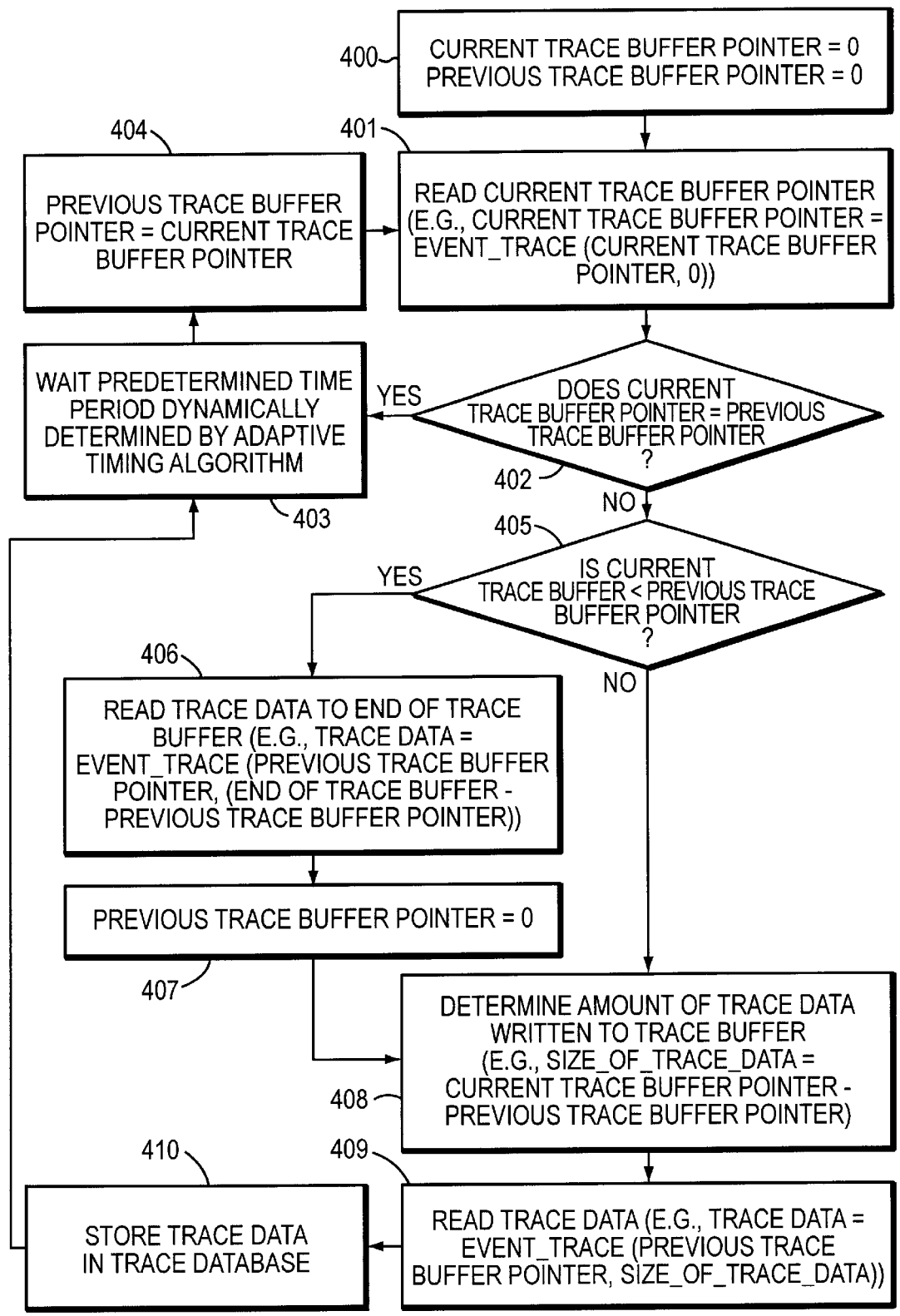
FIG. 5 is a flow chart of processing steps that show details of an operation of a Trace Capture Process configured according to embodiments of the invention.

FIG. 6 also illustrates the values of both the current trace buffer pointer 230-C as well as the previous trace buffer pointer 230-P after the trace routines 165, under control of the software program 153-1, write the trace data portions 190-8 through 190-13 into the trace buffer 160. Example numerical values of these variables (corresponding to trace buffer location positions) are illustrated at the top of FIG. 5 within the Trace Capture Process 120-2. Specifically, the start of the trace buffer is 1, the end of the trace buffer is 10, and the value of the current trace buffer pointer 230-C is equal to the trace buffer location 162-3 or "3", while the value of the previous trace buffer pointer 230-P is equal to the trace buffer locations 162-7 or "7 ".

Returning now to the discussion of the processing in step 405 in FIG. 4 (and referring to FIG. 6), under the aforementioned circumstances, the value of the current trace buffer pointer variable 230-C (at trace buffer location 162-3) is less than the value of the previous trace buffer pointer variable 230-P (at trace buffer location 162-7). This indicates that trace data 190 has been written beyond the end of the trace buffer 160 and has thus overwritten portions of trace data 190 beginning at the start of the trace buffer (trace buffer location 162-1). In this instance, the processing of the Trace Capture Process 120-2 in step 405 detects this situation and proceeds to step 406.

In step 406, the Trace Capture Process 120-2 first reads an amount of trace data starting from the location of the previous trace buffer pointer 230-P and extending to the end of the trace buffer (trace buffer location 162-10). As shown in FIG. 4, the exact amount of trace data 190 which the Trace Capture Process 120-2 accesses in this manner (i.e., the amount of data to read parameter 242) can be computed by subtracting the value of the previous trace buffer pointer variable (e.g., corresponding to trace buffer location 162-7 or just "7" in this example) from the value equal to the end of the trace buffer (e.g., "10" in this example). The result reflects the amount of trace data to be read from the position of the previous trace buffer pointer 230-P to the end of the trace buffer (i.e. up to and including the portion of trace data 190-10 stored in trace buffer location 162-10). As will be explained shortly, the call to the event trace routines 300 as illustrated in step 406 also causes the event trace routines to return the value of the current trace buffer pointer which corresponds to location 230-C in FIG. 6. Next, processing proceeds from step 406 to 407.

In step 407, the Trace Capture Process 120-2 sets the value of the previous trace buffer pointer variable to be zero ("0"). Processing then proceeds to steps 408 through 410 which operate as explained above according to the current values of the previous and current trace buffer pointer variables. In other words, if the Trace Capture Process 120-2 performs steps 408 to 410 after processing steps 406 and 407 as explained above, the value of the previous trace buffer pointer variable is zero and thus the trace data 190 obtained in response to the second system call to the event trace routines 300 in step 409 causes the event trace routines 300 to access the remaining portions of trace data 190-11 to 190-13 beginning at the start of the trace buffer and extending into the trace buffer 160 up to including the trace buffer location 162-3 of the current trace buffer pointer 230-C.

Accordingly, in situations where the trace data 190 is written to the trace buffer 160 beyond the end of the trace buffer, the Trace Capture Process 120-2 of this embodiment of the invention accesses the trace data 190 using two separate system calls, as illustrated in FIG. 6 is system calls 240-4A and 240-4B. The system call 240-4A performs a first read operation to read trace data 190 from the previous trace buffer pointer location 230-P to the end of the trace buffer 160, while the second system call 240-4B performs a second read operation to read any remaining portions of trace data 190 (i.e., portions which overwrite older trace data) from the start of the trace buffer to the current trace buffer pointer location 230-C. In this manner, the Trace Capture Process 120-2 of the invention is able to retrieve all trace data 190 from the trace buffer 160, even in situations where the trace data 190 is so voluminous so as to extend from the end of the trace buffer back to the beginning of the trace buffer.

FIG. 5 illustrates a flow chart of the processing operations performed by an event trace routine 300 configured according to one embodiment of the invention. As explained above, the event trace routine 300 resides as an operable entity (e.g., a system call, library routine, subroutine or other accessible logic entity) within the data storage system 150 and is remotely operable (i.e., callable) by the Trace Capture Process 120-2. Generally, the event trace routine 300 operates as explained above to return a trace buffer pointer value 230 and also, in some instances, portion(s) of trace data 190, depending upon the values of the parameters 241, 242 passed via the systems calls 240 to the event trace routine 300.

Specifically, in step 420, the event trace routine 300 receives a request for trace data (e.g., receives a system call 240). The request 240 includes a value (i.e., a parameter setting) for a trace buffer read position 241 (FIG. 3) as well as an amount of trace data to read 242 (FIG. 3). Such parameter values may be zero or non-zero values, which effects how the event trace routine 300 operates.

In step 421, the event trace routine 300 determines if the request for trace data (e.g., the system call 240) represents a request for the value of the current trace buffer pointer, or whether the request 240 also represents a request for trace data. Such a determination may be made by examining one or more of the values of the trace buffer pointer parameter 241 and/or the amount of trace data to read parameter 242 to determine if such values are zero. In a preferred embodiment of the invention, if the Trace Capture Process 120-2 provides a system call 240 to the event trace routine 300 which contains zero values for both parameters 241 and 242, then the event trace routine 300 in step 421 determines that the request for trace data (i.e., the system call containing the zero value parameters) is only a request for the current value of the trace buffer pointer 230.

If this is the case (i.e., if the system call 240 contains a call to the event trace routine containing parameters having a value of 0), then processing proceeds to step 423 at which point the event trace routine 300 obtains the current trace buffer pointer value 230 from the trace buffer 160.

Next, in step 424, the event trace routine 300 returns the current trace buffer pointer value 230 and any portions of trace data 190 that were read from the trace buffer 160. Such portions of trace data 190 may be read from the trace buffer 160, if, in step 421, the event trace routine 300 determines that the request for trace data 190 (e.g., system call 240) represents a request for trace data 190, in addition to a request for the value of the current trace buffer pointer 230.

That is, returning to step 421, if the request for trace data 240 contains non-zero parameter values 241 and 242, then processing proceeds to step 422 at which point the event trace routine 300 reads portions of trace data 190 from the trace buffer 160 beginning at the trace buffer read position parameter 241 and continuing until the amount of trace data to be read (i.e., as represented by parameter 242) is obtained (i.e. is read) from the trace buffer 160. This trace data is then returned to the calling entity, which in these examples is the Trace Capture Process 120-2.

Using such techniques, an event trace routine 300 configured according to embodiments of the invention is able to accept requests for either the value of the current trace buffer pointer 230, or the value of the current trace buffer pointer 230 in addition to one or more portions of trace data 190 which are to be obtained from the trace buffer 160. In response to such a request, the event trace routine 300 can access the request information and can return such information to the calling Trace Capture Process 120-2 for use as explained above to extract trace data 190 from the trace buffer 160 within the data storage system 150.

FIG. 9 shows how a table 520 detailing how a trace is unraveled for replay. The Thread Replay Process includes a Thread Builder that analyzes an I/O trace and unravels it for Threads that can played it back on the data storage system (discussed above with reference to FIGS. 2 and 8). Each trace I/O includes a timestamp shown in an appropriate column. Each trace I/O also includes information indicating the source, i.e. the port and channel director. By way of example, table 520 is shown with four columns, each one corresponding to a particular port coupled with a particular director on data storage system 150 (FIG. 1). One table is shown for convenience, but in practice it may be more convenient to first unravel the trace data in separate tables, wherein each table is related to a particular director and port, which then may be used to create such a table as 520 if needed for some reason. The trace can be unraveled in various ways, such as by looking for particular SCSI Command Descriptor Block (CDB) entries that describe SCSI I/O commands that may be seen over SCSI or Fibre ports, such as the ports on the preferred Symmetrix data storage system.

For example, I/O trace data is collected for times beginning at to and ending at $t_{l+n}$ that is sourced from each host interface port on each host channel director in communication with the data storage system 150. So in the representative example, I/O trace data at time $t_0$, is collected for each port and is noted as follows in an respective column in the table in the following fashion: $I/O_0$ (A-155), $I/O_0$ (B-155), $I/O_0$ (A-157), $I/O_0$ (B-157). This means, respectively that each I/O was collected at that particular time and can be sourced to the channel director import identified in the parentheses. And so for example, at time $t_{1+n}$ I/O trace data is likewise collected for each port on each channel director. Timer entries are collected for each port to allow calculating any offsets in time of I/O's that occur at almost the same time so that at any given point in time it can be discerned which ports were active.

The analysis is based on being able to sort by time and source of I/O (host channel director and port), so that the I/O can later be played back in symphonic fashion. Each channel in the preferred embodiment has own clock. Clocks must be synchronized, and the processor clock is considered. Inside each trace buffer every event has a timestamp that comes from a director. By checking global pointers, the system can determine where to write data and what data may be locked while being written by director. The contents are always different, but each director puts its on-time clock stamp and identifier which can then be synchronized to a global time for replay.

The playback process requires reading of the trace file and sending an I/O request at the appropriate time in order to emulate a real workload. An important aspect of the invention is playing back the I/O events in the correct sequence. It is extremely complicated because of all the I/O traffic, and devices and ports involved in a data storage system and that is at least one reason why a simple I/O driver-based system like those in prior art systems is inadequate for replaying a workload of a data storage system.

Figure 10:
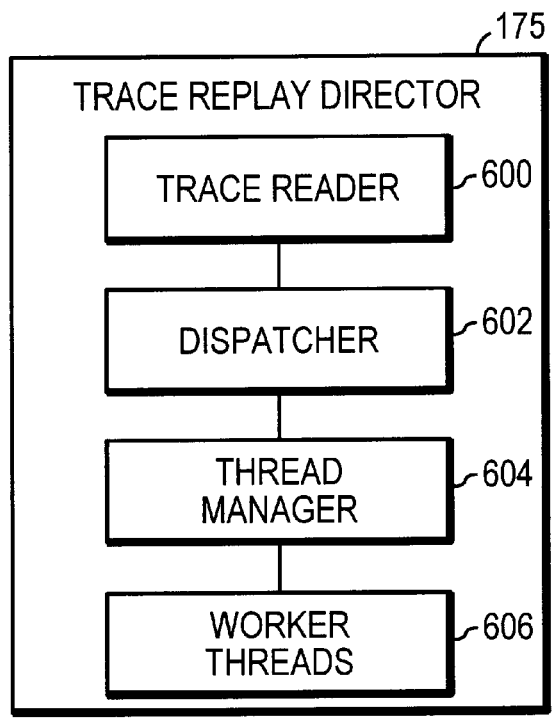
FIG. 10 shows a schematic block diagram of the trace replay director builder which is part of the trace replay process shown in FIGS. 1 and 2.

The Trace Replay Director 175 is shown in FIG. 10. The Replay Director is part of the Replay Process 148 and is responsible for turning the unraveled trace into a stream of I/O activity for Worker Threads (discussed below) that are marshaled back to the target data storage system 150 with the same timing and relative work activity (e.g. data size, and operation type) as the trace that was captured.

In order to accomplish this task, the director includes a Trace Reader 600, a Dispatcher 602, a Thread Manager 604, and one or more Worker Threads 606. The Thread Manager includes the ability to issue more Worker Threads if needed. The Trace Reader 600 reads the trace file and passes the trace as an I/O operation to the Dispatcher 602. The Dispatcher assigns the I/O operation to the next available Worker Thread of Worker Threads 606. It is the Worker Threads that are responsible for having the assigned I/O sent to the target data storage system on time. A Worker Thread also is responsible for sending the I/O over the correct port.

The Thread Manger 604 starts and stops Worker Threads and adds more should the Replay Process start executing I/O's late, and this ensures that replayed I/O activity is at the appropriate level of the work seen originally. The Dispatcher only assigns work to the next available Worker Thread and then it signals when the playback is complete The Thread Manager measures the I/O activity, determines when the Worker Thread gets finished for example, and when to activate the next one over host interface lines 141 for input directly through channel director 155 and 157 and their respective ports, or over 159 and its ports for causing playback of I/O work on data storage system 150.

Upon invocation the Dispatcher parses and validates all command line arguments. The target data storage system for playback is then polled for configuration information. The Trace Reader is then launched which begins reading the trace data and queues it to the buffer. If the end of the trace data is reached, it restarts from the beginning. It continues this process until the playback is complete.

The Thread Manager manages all I/O Worker Threads and monitors the playback to insure the I/O workers are starting the I/Os on time. If there is a lag, the Thread Manager dispatches additional I/O Worker Threads, as discussed above. Optionally, statistics collection may be enabled/initialized for collecting statistics of the target data storage system. Also optionally, the Trace Capture application may be launched to capture traces of the I/Os being played back.

The Replay Process reads the I/O buffer and assigns I/Os to the Worker Threads, which perform the I/O operation, until all I/Os are completed, or until a predetermined time is reached. It then notifies the Trace Reader, Thread Manager, and Worker Threads that playback is complete.

Figure 11:
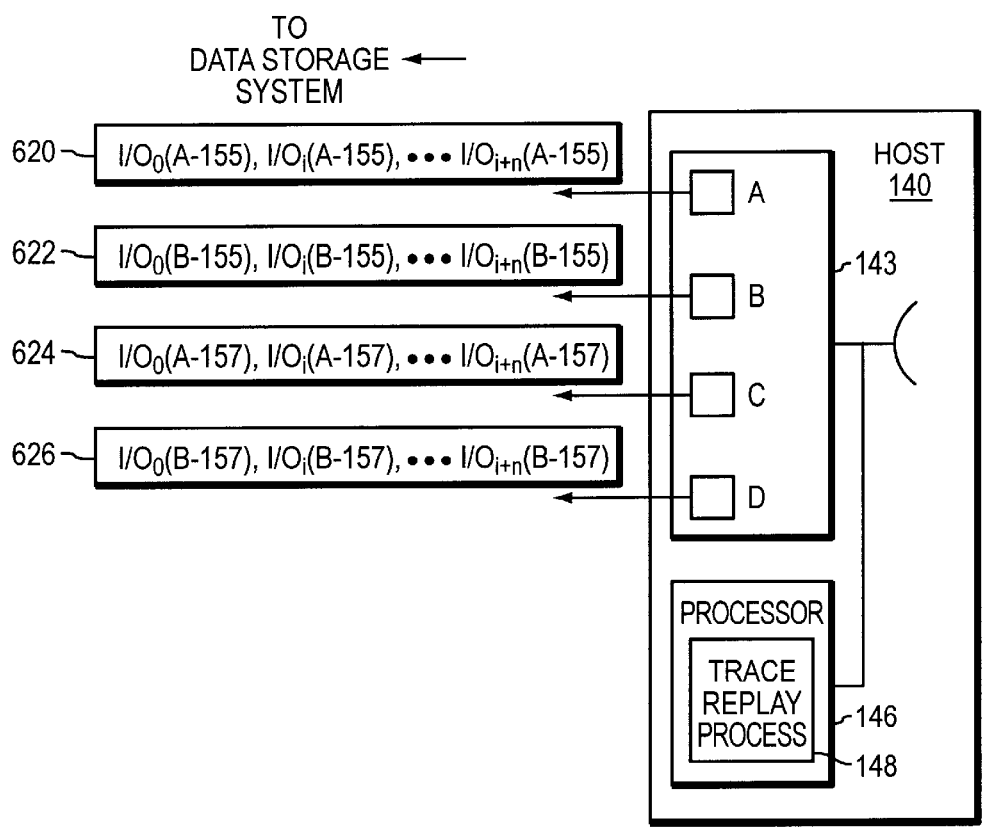
FIG. 11 shows a example of threads being replayed for the exemplary data storage system of the system of FIG. 1.

The I/O Worker Threads wait to be assigned a particular I/O operation to perform, with delays appropriately based on the I/O timestamp and an implied performance counter that is part of the replay process, An I/O command for the specified storage device on a specified storage data port in effect replays the captured trace. Once the I/O is completed, the I/O Worker Thread waits to be assigned another I/O operation. This continues until the Dispatcher indicates playback is complete. Optionally, statistics collection and the Trace Capture Application can be stopped. When all threads terminate, statistics are computed and displayed, then execution is complete. FIG. 11 shows I/O's 620,622 624, and 626 being played back over channel interface 142. Note that the I/O's correspond to the information gathered in the unraveled trace table (FIG. 9) and each I/O is identified with a timestamp and the source (director import) of the data, as well as the other information discussed above with reference to I/O description. The replayed I/O is then received through a host channel director and played back so that the same type of operation and size of data operates on the same logical volume as the original captured trace.

Thus, the playback can essentially be turned on to create an experimental or lab type of environment wherein the I/O activity experienced at one time can be recreated on the same or a different host system. Or various factors can be manipulated to see what impact that has. And multiple hosts can be simulated using such playback. Thus, the invention provides a low cost but very accurate way to test multiple types of scenarios that might occur in a production environment.

While the example explanations of preferred embodiments presented herein explain certain techniques for accessing trace data and playing it back within the data storage system, it is to be understood by those skilled in the art that variations on these mechanisms and techniques are possible and are intended to be within the scope of embodiments of the invention. For example, the host computer systems may be any type of general purpose or dedicated (e.g., specific purpose) computer system and it is to be understood that the host computer system shown in the figures is shown by way of example only. Likewise, the data storage system can be any type of data storage system, large or small, and may contain any number of processors that operate to produce trace data 190 in a manner such as that explained above, and replay it as claimed below.

Figure 13:
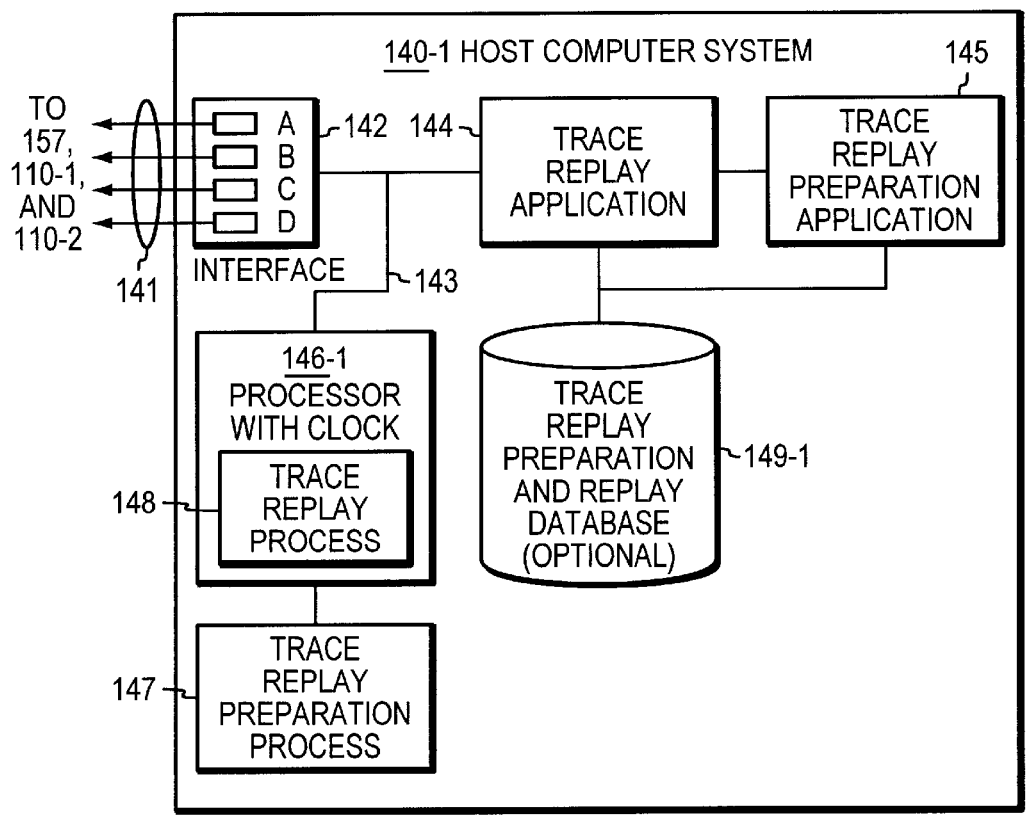
FIG. 13 is a block diagram schematic of another embodiment of the system of this invention including a data storage system and application and process program logic operating in computer memory for carrying out embodiments of the method of this invention.

System Architecture of an Embodiment Useful for Preparing, and Replaying Captured Trace Data FIG. 13 shows a block diagram schematic of another embodiment of the system of this invention for preparing, and replaying data captured as described above with reference to FIG. 1, and the description of methods of capturing such data given above. The system of FIG. 13 includes data storage system and application and process program logic operating in computer memory for carrying out embodiments of the method of this invention. Preferably, host computer 140-1 includes an interconnection mechanism 143 coupling memory and application combinations 144 and 145, a processor with clock 146-1 and a host interface 142 having HBA's 142A–D. Generally, host computer 140-1 is similar to 140 (FIG. 1) but also includes special software logic for carrying out a preparation of replay data, and is shown being configured with interconnections 141 for interacting with elements 157, 110-1, and 110-2 of FIG. 1 in an identical or at least similar fashion as similar elements also discussed with reference to FIG. 1. Regarding the shown embodiment, it should be understood that the Replay Preparation Process of this invention may be independent of both the Trace Capture and Replay Process described with reference to FIGS. 1–12, but as shown in FIG. 13, the Replay Preparation Process may also be used in cooperation with these processes (as well as other trace capture and replay processes).

Memory is encoded with logic instructions such as software application code and/or data that collectively form a Trace Replay Application and memory combination 144 and Trace Replay Preparation Application and memory combination 145, wherein each is configured in accordance with embodiments of the invention. The processor with clock 146-1 can access the logic instructions that form the Trace Replay Application and the Trace Replay Preparation Application via the interconnection mechanism to the memory in order to perform (e.g., execute, run, interpret or otherwise operate) such logic instructions. When this happens, a Trace Replay Process 148 and a Trace Replay Preparation Process 147 are formed via the combination of the logic instructions of the replay application operating on the processor. In other words, the Trace Replay Application and the Trace Replay Preparation Process each represent an embodiment of the invention in a computer readable medium such as the memory, which includes logic instructions that when performed on the processor, provide an embodiment of the invention referred to herein as the Trace Replay Process and the Trace Replay Preparation Process. During operation, the Trace Preparation Process can prepare I/O data so that the Replay Process can replay threads that duplicate I/O activity form a captured trace as explained below. Alternatively, the computer readable medium may otherwise be encoded with program logic 710 for carrying out process 147 and 148, as shown and discussed with reference to FIG. 12.

Functions and Methodology

Figure 14:
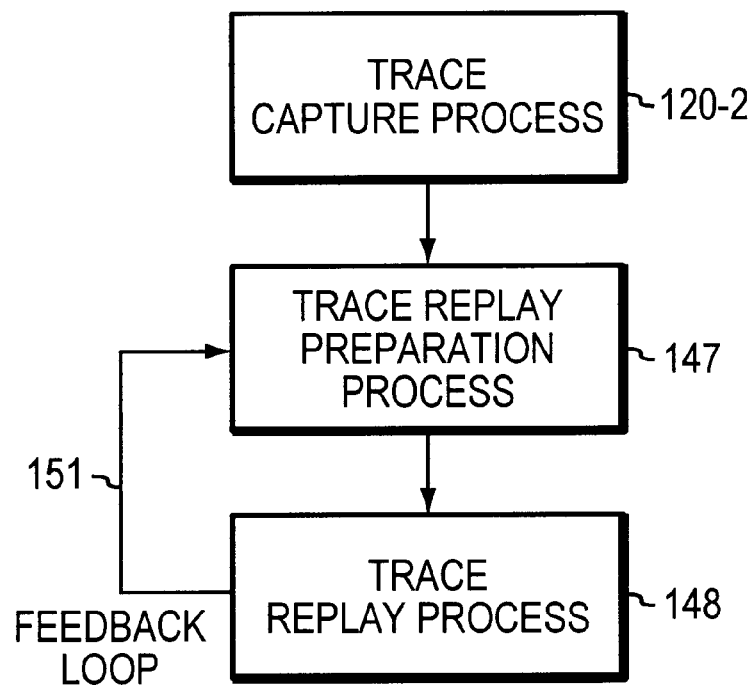
FIG. 14 shows a schematic block diagram overview of the functional relationship of the Trace Capture Process, the Trace Replay Preparation Process, and the Trace Replay process that operate as an embodiment of the method of this invention with the embodiment of the system shown in FIG. 13.

FIG. 14 shows a schematic block diagram overview of the functional relationship of the Trace Capture Process, 120-2 (FIG. 1) the Trace Replay Preparation Process 147, and the Trace Replay Process 148 that operate as an embodiment of the method of this invention with the embodiment of the system shown in FIG. 13. The Trace Capture Process 120-2 provides a trace file that is used by the trace Replay Preparation Process 147 to prepare the data for playback by the Trace Replay Process 148, and a Feedback Loop 151 between the Process 147 and the output of the Process 148 allows for manipulation and customizing of prepared data in view of the effect of replaying it, as will be described in detail below.

Figure 15:
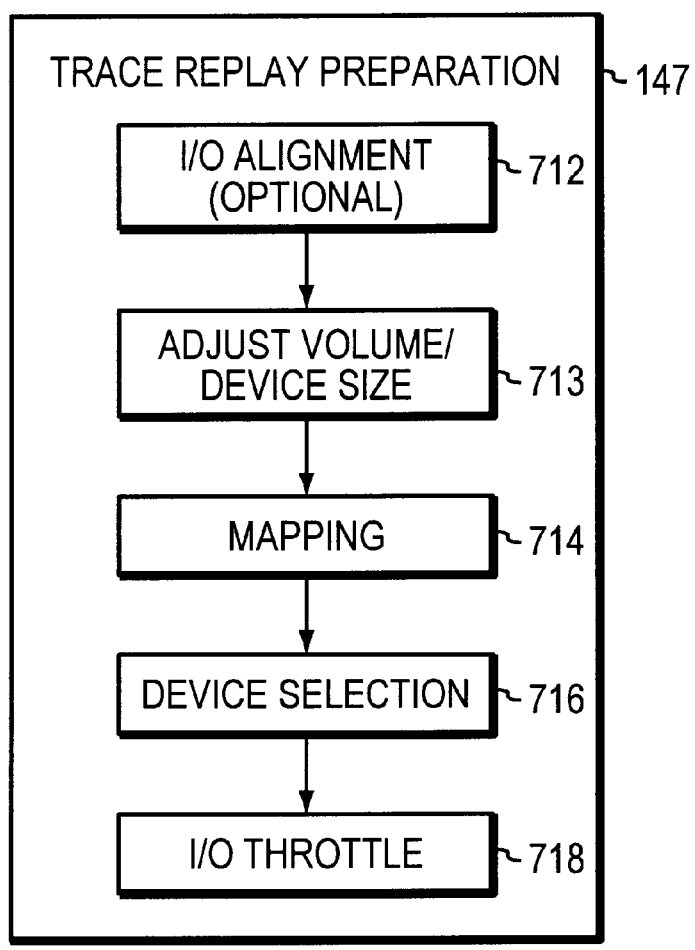
FIG. 15 shows a schematic block diagram of the Trace Replay Preparation Process which is part of system of FIG. 13.

FIG. 15 shows a schematic block diagram of the Trace Replay Preparation Process 147 that is part of system of FIG. 13, and is also described above with reference to FIG. 4. The Process 147 is configured to carry out the following functions which are all explained in greater detail below, including by providing an example: I/O alignment 712, adjust volume/device size (if needed), mapping 714, device filtering or selection 716, and I/O adjustment compensator or throttle 718 (throughout, I/O and IO are used interchangeably), as is generally practiced in the relevant art.

A brief description in sequential order of these functions is now given. The I/O's captured in the trace file may be, optionally, modified by the preparation process to make sure that they are aligned on sector boundaries acceptable on the target system. The volume size may need to be adjusted if there are such differences between the source and the target. The mapping function is for ensuring that I/O's are co-located on the same or very similar ports and devices on the target system as the source system of the captured trace. The process can filter out certain devices in the output for replay depending on activity level. The process can produce output for replay that will result in the replayed trace being run faster or slower depending on needs on the target system. Feedback via the Feedback Loop 151 (FIG. 13) is used in some cases to achieve such functionality by monitoring the replay activity and adjusting, if desired and or needed, according to the effect of replay.

Figure 16:
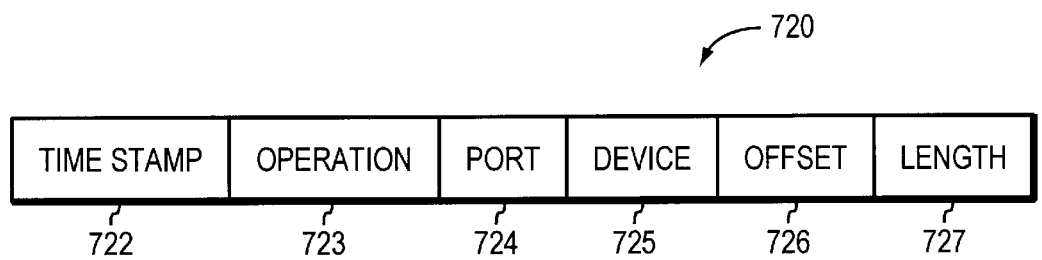
FIG. 16 is a schematic of a data structure that is useful with this invention.

FIG. 16 shows an overall data structure of collected workload profiles collected or captured, in representation of work performed on storage systems, switches, or host computers, and useful for preparing the trace for replay with the present invention. Although there is no standard format, there are several attributes that define an individual IO in a trace. The profiles are represented by Fields 722–727, which, respectively, show, a time stamp, operation or IO type (read or write), port, device, offset of data, and size or length of data.

A general description of the above-described profiles follows. A time stamp field 722 records when the IO is issued by the host system or received by the storage system, it is a floating point number, the unit is seconds. The operation IO type shows the direction of the IO relative to the storage system, i.e., whether a read or write command is issued to disk, preferably a text string. A port identifier field yields a record of either the Source port id that indicates which HBA (host-based adapter: the fibre channel or SCSI card on the host) initiated the IO, on a preferred EMC Symmetrix system. Alternatively, it may indicate a target port id that identifies the port on the storage system where the IO is expected to arrive, and preferably this is a hexadecimal integer. The device field identifies the storage volume, and may be in the form of a LUN (logical unit number) in the case of a preferred Symmetrix, preferably this is a hexadecimal integer. The offset field (e.g., an LBA—logical block address) identifies the starting address of the IO, and is preferably a hexadecimal integer. The length field indicates the size of the IO, generally measured in blocks, e.g., 512 bytes.

Figure 17:
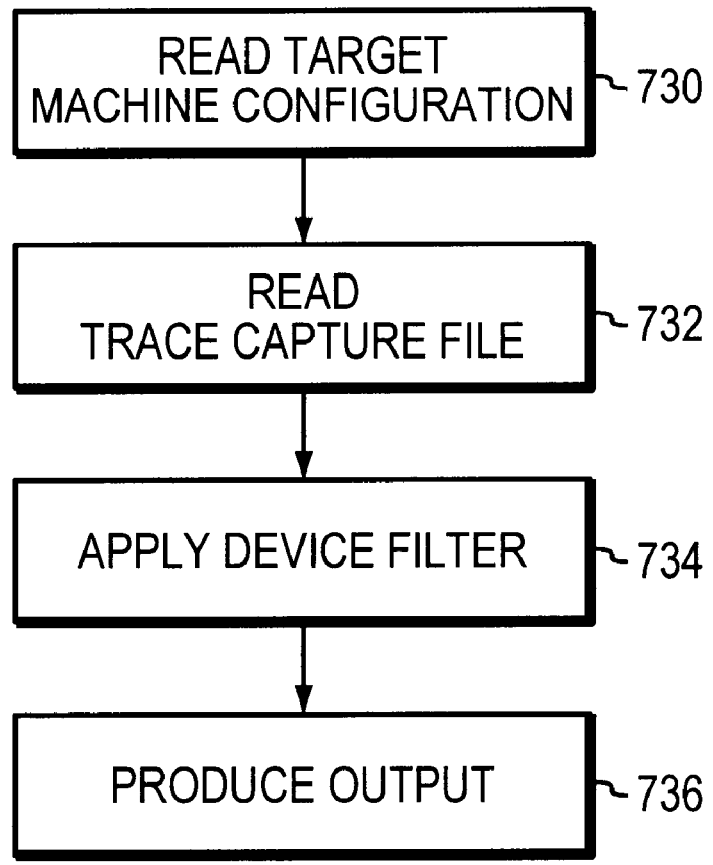
FIG. 17 is a flow chart of processing steps that show in accordance with at least a part of an embodiment of this method how trace data is prepared for replay in accordance with embodiments of the method of this invention.

FIG. 17 shows a flow chart of processing steps that show how trace data is prepared for replay in accordance with embodiments of the method of this invention. An overall view of the preparation process is shown in steps 730, 732, 734, and 736. In step 730, the target machine configuration is read, and in step 732, the captured trace file is read. In step 734 the device filter is applied for device selection, and in step 736 the output for replay is produced.

Descriptions of the above-described steps now follow. In step 730, the configuration for the target machine is read and stored, preferably, in the following format: $Host_1$ information $Host_2$ information . . . $Host_n$ information. The host information is stored in the following format: name of the host $port_1$ information port 2 information . . . t $port_n$ information. The port information is stored in the following format: port identifier $device_1$ information $device_2$ information. $device_n$ information. The device information consists of the name of the device or volume.

The following table illustrates a case where the number of ports and volumes may vary:

| Host ID | Port ID | Volume ID |
| --- | --- | --- |
| HostA | port1 | Volume1 |
| HostA | port1 | Volume2 |
| . . . | . . . | . . . |
| HostA | port1 | VolumeN |
| HostA | port2 | Volume1 |
| HostA | port2 | Volume2 |
| . . . | . . . | . . . |
| HostA | port2 | VolumeN |
| . . . | . . . | . . . |
| HostA | portN | VolumeN |
| . . . | . . . | . . . |
| HostB | port1 | Volume1 |
| HostB | port1 | Volume2 |
| . . . | . . . | . . . |
| HostB | port1 | VolumeN |
| . . . | . . . | . . . |
| HostB | portN | VolumeN |
| . . . | . . . | . . . |
| HostZ | portN | VolumeN |

In the preferred Symmetrix system, the configuration is gathered from an internal configuration text file. This is a text file. Each line in the file describes one device. The format of such a line is: device_number, host, device_file, and port, wherein the device number is the logical device number (hexadecimal integer), the host is the name of the host from where the device is accessible (alphanumeric string), the device file is the name of the device in the file system space of the host (e.g. a UNIX pathname), and the port is the port used in the processor. These attributes define the path taken by the IO into the data storage system.

Figure 18:
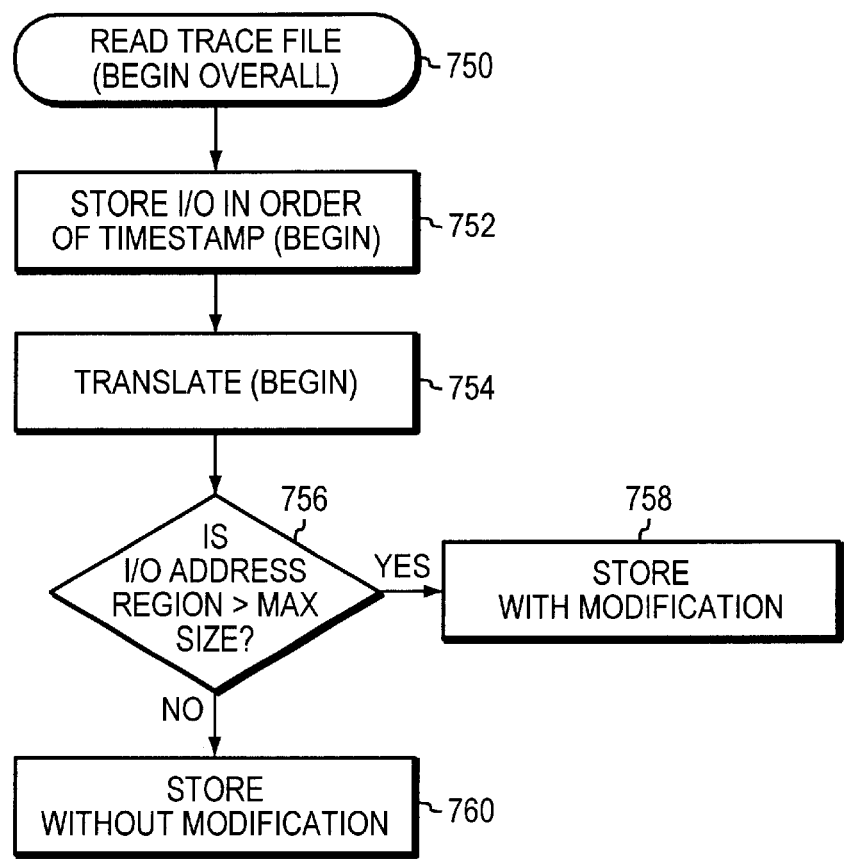
FIG. 18 is another flow chart of processing steps that show in accordance with at least a part of an embodiment of this method how trace data is prepared for replay in accordance with embodiments of the method of this invention.

FIG. 18 shows another flow chart of processing steps that show in accordance with at least a part of an embodiment of this method how trace data is prepared for replay in accordance with embodiments of the method of this invention. Specifically FIG. 18 shows the reading of the trace file step shown in FIG. 17. This process begins at step 750. In step 752 the beginning step of storing the I/O in order in accordance with its timestamp is initiated. Part of the storing step involves translation which begins at step 752. An inquiry step 756 determines wheter the I/O address region is greater than the maximum size on the target. If so the I/O is stored with modification in step 758 and without modification in step 760.

Futher regarding the reading step described in FIGS. 17 and 18, the trace file is read and stored, preferably, in the following format: $port_1$ IO's $port_2$ IO's . . . $port_n$IO's. wherein the IO's for each port are organized as follows: $device_1$ IO's device2 IO's . . . $device_n$ IO's The device IO's are stored in the following format: $IO_1$ timestamp parameters $IO_2$ timestamp parameters . . . $IO_n$ timestamp parameters. The IO's are stored in increasing order of the timestamp.

The parameters consist of operation, i.e. read or write, offset, and length. Before each I/O is stored it is translated (see steps 752–760, FIG. 18) in one of the following ways:

a) If the IO addresses a region beyond the maximum sixe of a device on the target machine, the virtual devices (of size equal to the maximum device size on the target machine) are created and the IO is reassigned after modifying the offset and length fields appropriately;

b) If the IO addresses a region beyond the maximum size of a device on the target machine, then the I/O is ignored; and c) If the IO addresses a region beyond the maximum size of a device on the target machine, then the offset field of the I/O is made to wrap around the maximum device size in the target machine.

Figure 19:
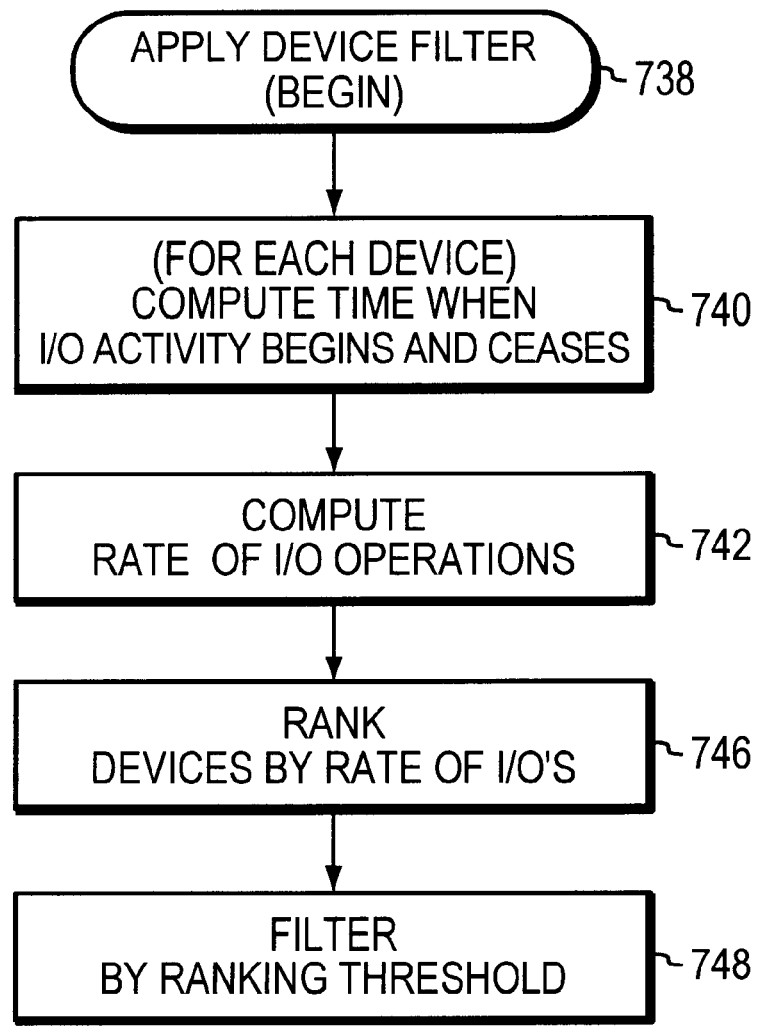
FIG. 19 is another flow chart of processing steps that show in accordance with at least a part of an embodiment of this method how trace data is prepared for replay in accordance with embodiments of the method of this invention.

FIG. 19 shows another flow chart of processing steps that show in accordance with at least a part of an embodiment of this method how trace data is prepared for replay in accordance with embodiments of the method of this invention. Specifically FIG. 19, shows the application of applying the device filter step shown in FIG. 17. It begins in step 738. In step 740, and for each device, the time is computed when I/O activity begins and ceases. The rate of I/O operations are computed in step 742. The devices are ranked by the rate of I/O's in step 746. The devices are then filtered by the ranking threshold in step 748, e.g. by keeping only the top ranked devices, which in any case the criterion for ranking is user selectable.

Figure 20:
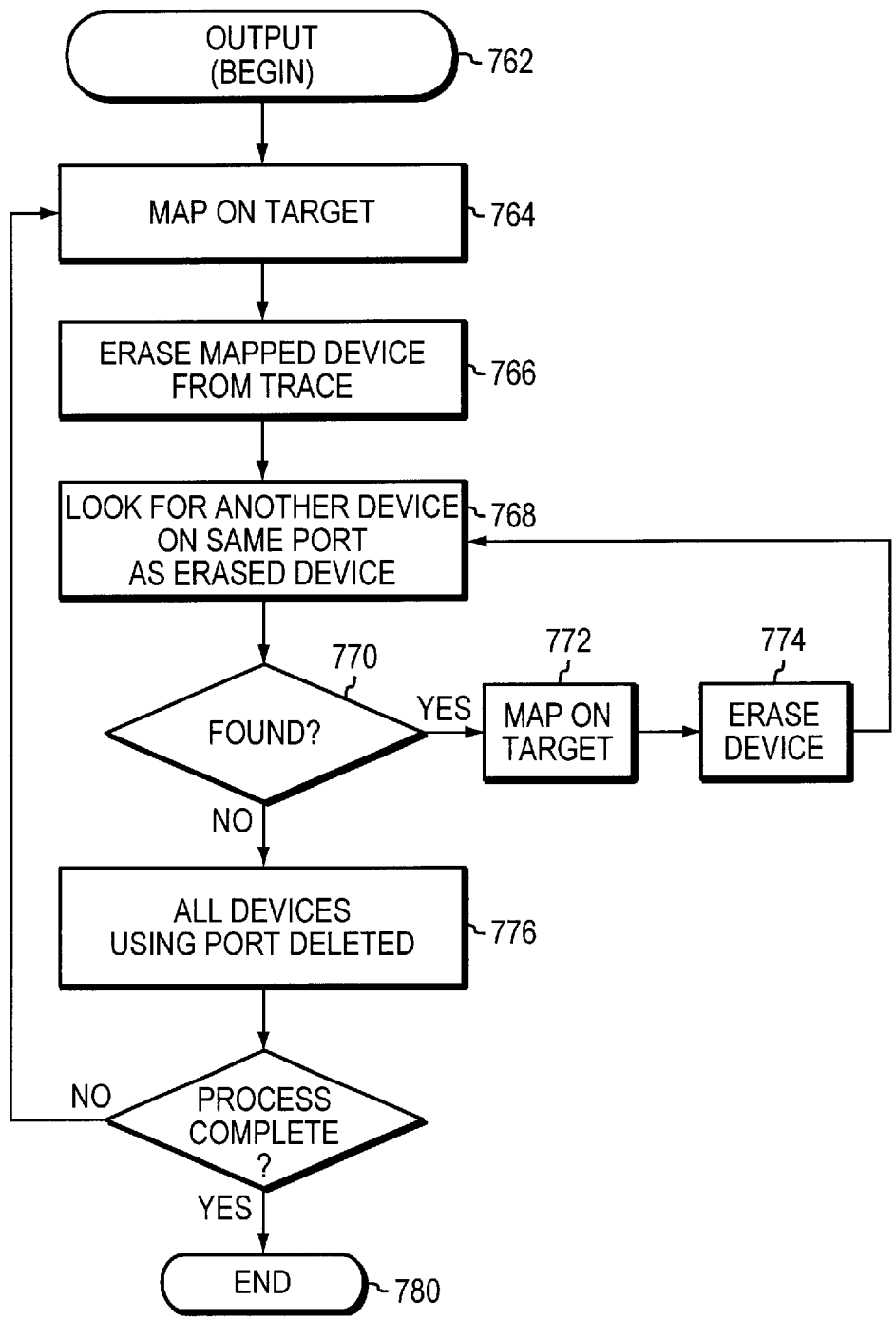
FIG. 20 is another flow chart of processing steps that show in accordance with at least a part of an embodiment of this method how trace data is prepared for replay in accordance with embodiments of the method of this invention.

FIG. 20 shows another flow chart of processing steps that show further how trace data is prepared for replay in accordance with embodiments of the method of this invention. Specifically FIG. 20, shows the application of preparing for output which may include the I/O throttling of FIG. 17. The output preparation begins in step 762. Mapping on the target begins in step 764. The device mapped is then erased from the captured trace file in step 766. The process includes the step 768 of searching for another device on the same port as the erased device. If one is found in step 770 then it is also mapped on the target in step 772 and the device is erased in step 774 from the trace file, and the loop step 768 and 770 continue into no such device is found. Then in step 776 all devices on the port are deleted until the process in complete according to the inquiry of step 778 and the process ends in step 780 after loop 764–778 is finished.

An example is now given to illustrate the methodology outlined above. The following, data shown in Replay Preparation Example Table 1 is a sample IO trace collected from the preferred Symmetrix. The columns indicate time stamp, IO type, target port id, volume, offset and size.

Replay Preparation Example Table 1

| Time stamp | IO type | Target Port ID | Volume | Offset | Size |
|---|---|---|---|---|---|
| 0.071105 | Read | 1b | 0456 | 12357834 | 128 |
| 0.071550 | Read | 2c | 0457 | 11562066 | 48 |
| 0.071892 | Read | 16a | 0571 | 82248770 | 56 |
| 0.072221 | Write | 16c | 0455 | 11912034 | 24 |
| 0.072359 | Read | 16a | 0459 | 10493106 | 16 |
| 0.073109 | Read | 16a | 0459 | 10493242 | 8 |
| 0.073535 | Read | 16a | 0459 | 10493138 | 16 |
| 0.073874 | Read | 16a | 04E1 | 44099778 | 48 |
| 0.074384 | Read | 16a | 04E1 | 44932650 | 72 |
| 0.074475 | Write | 1a | 0524 | 63230262 | 8 |
| 0.075159 | Read | 2a | 05BB | 97389134 | 32 |

Source port id is not given in this particular example. But, in general, when evaluating performance of a storage system (direct attached to a host), source port id will not be needed. However, when evaluating performance of a Storage Area Network (SAN) which may include at least one storage system and at least one switch, then source port id is required to define the topology of the storage network. For simplification purposes, the given example focuses only on a single storage system. However, one skilled in the art will recognize that similar ideas as described here can be used when evaluating performance of SANs with prepared trace replays.

In general, before every trace replay, the original trace, which will be referred to as source trace) collected from source storage system or host needs to be modified so that it can be replayed on the target storage system. The modified source trace file ready for replay on the target system will be referred as target trace file.

A front-end configuration in a storage system describes which volumes will be accessible by which front end ports, and the size of the volumes (using terminology from the preferred symmetrix system, but one skilled in the art, will recognize the applicability to other data storage systems). As a result, source trace file, which reflects the configuration of the source system, should be modified to reflect configuration of the target system. The extent of modification depends on the purpose of the replay. If, for example, the purpose of the replay is problem recreation and troubleshooting, then the changes should be kept to a minimum. Effectively, in this case, the target configuration should reflect the same characteristics of the source configuration. Keeping the same configuration as the source configuration decreases many flexibilities of trace replay technology. Yet, it is still a powerful and effective tool to analyze performance issues.

If the purpose of the replay is benchmarking or consolidation, then it is a good choice to modify the source trace file so that it is "replayable" on the target system. The modifications will generally be two fold: (1) volume and front end port assignments; and (2) volume size accomodations.

The so-called back-end configuration (again employing terminology from the preferred symmetrix, but applicable by analogy to other systems) defines which volumes would reside on which physical disks. Back-end configuration should be designed very carefully to prevent bottlenecks that would impact the front-end performance. Since it is not possible to predict the back-end workload of a trace beforehand, the inventors, have critically recognized that it is a good choice to check the balance of the workload after the replay to make sure there are no bottlenecks, i.e. by using the feedback loop shown in FIG. 14.

If volume or ports need to be re-assigned in view of the target configuration, there are principally, at least two alternatives:

1) keep the port assignments in the source trace intact, and assign volumes in one port of the source trace to one port in the target configuration; and/or.

2) assign source volumes to target volumes using elevator algorithm independent of the port assignments in source trace.

To illustrate these alternatives, a simplified example, is now given. In the example, assume that the target configuration has 4 available ports (3a, 4a, 13a and 14a).

The relevant information about source trace is as follows, shown in:

Replay Preparation Example Table 2.

| Port id | Volume id | Avg. IO activity (IOs/s) |
|---|---|---|
| 3a | 105 | 20 |
| 3a | 1AF | 40 |
| 4b | 201 | 100 |
| 4b | 154 | 80 |
| 4b | 109 | 5 |
| 13d | 1CB | 70 |
| 14c | 0FB | 65 |
| 14c | 11D | 15 |

With the first approach the assignments would be as follows, shown in:

Replay Preparation Example Table 3:

| Source Trace | | | Target Trace | |
|---|---|---|---|---|
| Port id | Volume id | Avg. IO activity (IOs/s) | Port id | Volume id |
| 3a | 105 | 20 | 3a | 000 |
| 3a | 1AF | 40 | 3a | 001 |
| 4b | 201 | 100 | 4a | 010 |
| 4b | 154 | 80 | 4a | 011 |
| 4b | 109 | 5 | 4a | 012 |
| 13d | 1CB | 70 | 13a | 020 |
| 14c | 0FB | 65 | 14a | 030 |
| 14c | 11D | 15 | 14a | 031 |

To find the assignments with the second approach, first sort all the volumes based on average IO activity (other criteria may also be used for sorting). The volumes are assigned to ports, shown in Replay Preparation Example Table 3

| Source Trace | | | Target Trace | |
|---|---|---|---|---|
| Port id | Volume id | Avg. IO activity (IOs/s) | Port id | Volume id |
| 4b | 201 | 100 | 3a | 000 |
| 4b | 154 | 80 | 4a | 010 |
| 13d | 1CB | 70 | 13a | 020 |
| 14c | 0FB | 65 | 14a | 030 |
| 3a | 1AF | 40 | 14a | 031 |
| 3a | 105 | 20 | 13a | 021 |
| 14c | 11D | 15 | 4a | 011 |
| 4b | 109 | 5 | 3a | 001 |

Once the volume and port assignments are done, all IOs belonging to source volume/source port pair are assigned to target volume/target port pair in the target trace. As the example points out, the first approach keeps port assignments of the original configuration where the trace is collected. This approach might be useful for benchmarking purposes, since the original environment had these assignments; in the benchmark replays it makes sense to keep the same port assignments. For some troubleshooting replays this approach may also be used.

As seen from the example the second approach attempts to balance the IO activity across target ports evenly. With the first approach the target ports 3a, 4a, 13a and 14a are assigned 60, 185, 70 and 80 IOs per second, respectively. With the second approach these values become 105, 95, 90, 105 IOs per second. The second approach is best for consolidation and capacity planning purposes. However, it may still be used for benchmarking replays as well.

Generally, if the number of volumes in the source trace is greater than that in the target configuration, then some of the source volumes have to be eliminated. With the second approach the elimination is simple: sort all the volumes (based on a criteria like avg. IO rate), then eliminate all the volumes that exceed the number of volumes in the target configuration. With the first approach, it is a good choice to look for number of volumes in each source port and target port. Excessive volumes in each source port are then eliminated by assigning most active volumes to the target port (See FIG. 20 above). Regarding the volume size, when the offset+IO size of the source volume is greater than maximum offset of the target volume, the source offset has to be modified so that it falls within the addressable range of the target volume as described above.

With regard to using the feedback loop to adjust or throttle IOs (i.e. speed up the IO rate or slow it down in accordance with the analysis of the replay), the following discussion is now given. An important issue with replaying traces is to make sure that IO's are issued at the prescribed times in the input trace file. While modifying source trace to target trace in previous steps, time stamp information has been preserved. Furthermore, trace replay facilities report delayed IOs when they are not issued on time during the replay. As a post-processing step, it is a good choice to observe the number of delayed IOs, and make sure that it is within predefined limits.

The inventors have critically recognized that limiting delayed IOs to zero will make sure that the replay process does not disturb the dependent IO patterns in the trace; however, due to nature of measurements, number of delayed IOs may not be always zero. This may be caused by accuracy of measurement or other factors. As a result, the inventors have recognized that it is a good choice to allow a small fraction of all IOs in the trace to be late, e.g. 0.1% or less. If there are too many delayed IOs (as defined above), then there are two good choice alternatives: (1) slow down the trace replay speed (this can be achieved by passing a parameter to the replay process, or multiplying the time stamps in the target trace file with a constant number); or. (2) change configuration. Based on the judgment of the user of the inventive system described herein, the front end or back end configurations, in the preferred Symmetrix, can be changed to eliminate excessive number of delayed IOs. This approach may not be appropriate if we one is trying to troubleshoot a performance problem, but may otherwise be acceptable. After either of these changes are made, then the trace replay should be repeated to make sure number of delayed 1 Os has decreased to acceptable levels.

The inventors have further recognized that the backend IO workload have to be monitored during the post-replay analysis through the feedback loop. In general for benchmarking and consolidation purposes, the IO workload in the backend should not be skewed toward one resource, e.g., a subset of disk drives or disk drive controllers. For troubleshooting purposes, unless creating a hot spot in the backend is the intention of the test, backend skewness should also be avoided. If the backend load is significantly imbalanced, then the backend configuration must be changed to allow balanced distribution, and the trace replay should be repeated.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for preparing for playing a captured trace of I/O commands in a data storage environment including at least one host computer and a first storage system that is in communication with the at least one host computer and which environment includes a plurality of data storage volumes representing data stored on physical storage devices that are part of the at first data storage system and which data storage volumes represent data stored on physical storage devices that are part of a first data storage system that is in communication with at least one host computer, the method comprising steps of:

preparing an accessed trace from the first data storage system for being played as a replication of the trace of workload data on one or more data storage volumes included with a second data storage system by adjusting either the size or the number of volumes subsequent to a step of accessing and prior to a step of playing, wherein the step of accessing and playing include:

accessing a trace of I/O commands from the at least one host computer to the first data storage system that are experienced on one or more data storage volumes of the plurality of data storage volumes that represent data stored on the first data storage system; and playing a replication of the trace of I/O commands on one or more data storage volumes included with a second data storage system, and wherein the playing of the trace includes analyzing the trace of I/O commands.

2. The method of claim 1, wherein the first and second data storage system are the same data storage system.

3. The method of claim 1, wherein the preparing of the trace is performed so that it may be played for benchmarking purposes.

4. The method of claim 1, wherein the preparing of the trace is performed so that it may be played for troubleshooting purposes.

5. The method of claim 1, wherein the preparing of the trace is performed so that it may be played for consolidation purposes.

6. The method of claim 1, wherein the preparing of the trace is performed so that it may be played for capacity planning purposes.

7. The method of claim 1, wherein the IO rate is adjusted as part of the preparing of the trace for being replayed.

8. The method of claim 1, wherein the port assignments are adjusted as part of the preparing of the trace for being replayed.

9. The method of claim 2, wherein the IO rate is adjusted as part of the preparing of the trace for being replayed.

10. The method of claim 2, wherein the port assignments are adjusted as part of the preparing of the trace for being replayed.

11. A system for preparing for playing a captured trace of I/O commands in a data storage environment, the system comprising:

a first data storage system with physical data storage devices that are included with the first data storage system;

at least one host computer in communication with the first data storage system and which communicates I/O commands to the first data storage system;

a second data storage system; and a computer system for cooperating with the first and second data storage system for preparing an accessed trace for being played as a replication of the trace of workload data on one or more data storage volumes included with a second data storage system by adjusting either the size or the number of volumes subsequent to a step of accessing and prior to a step of playing, wherein the step of accessing and playing include accessing a trace of I/O commands from the at least one host computer to the first data storage system that are experienced on one or more data storage volumes of the plurality of data storage volumes that represent data stored on the first data storage system; and playing a replication of the trace of I/O commands on one or more data storage volumes included with a second data storage system, and wherein the playing of the trace includes analyzing the trace of I/O commands.

12. A program product for preparing for playing a captured trace of I/O commands in a data storage environment including at least one host computer and a first storage system that is in communication with the at least one host computer and which environment includes a plurality of data storage volumes representing data stored on physical storage devices that are part of the at first data storage system and which data storage volumes represent data stored on physical storage devices that are part of a first data storage system that is in communication with at least one host computer, the program product including a computer readable medium with program logic configured for causing the following computer-executed steps to occur:

preparing an accessed trace from the first data storage system for being played as a replication of the trace of workload data on one or more data storage volumes included with a second data storage system by adjusting either the size or the number of volumes subsequent to a step of accessing and prior to a step of playing, wherein the step of accessing and playing include:

accessing a trace of I/O commands from the at least one host computer to the first data storage system that are experienced on one or more data storage volumes of the plurality of data storage volumes that represent data stored on the first data storage system; and playing a replication of the trace of I/O commands on one or more data storage volumes included with a second data storage system, and wherein the playing of the trace includes analyzing the trace of I/O commands.

* * * * *